United States Patent
Bills et al.

(10) Patent No.: US 10,795,723 B2
(45) Date of Patent: *Oct. 6, 2020

(54) MOBILE TASKS

(71) Applicant: Palantir Technologies Inc., Palo Alto, CA (US)

(72) Inventors: Cooper Bills, Mountain View, CA (US); Steven Fackler, Palo Alto, CA (US); Zennard Sun, Mountain View, CA (US); Maja Wichrowska, Alpharetta, GA (US); David Villarreal, San Pedro Garza Garcia (MX)

(73) Assignee: PALANTIR TECHNOLOGIES INC., Pal Alto, CA (US)

( * ) Notice: Subject to any disclaimer, the term of this patent is extended or adjusted under 35 U.S.C. 154(b) by 74 days.

This patent is subject to a terminal disclaimer.

(21) Appl. No.: 15/646,010

(22) Filed: Jul. 10, 2017

(65) Prior Publication Data

US 2017/0308402 A1    Oct. 26, 2017

Related U.S. Application Data

(63) Continuation of application No. 14/196,814, filed on Mar. 4, 2014, now Pat. No. 9,727,376.

(51) Int. Cl.
*G06F 9/46* (2006.01)
*G06F 9/48* (2006.01)
(Continued)

(52) U.S. Cl.
CPC ....... *G06F 9/4881* (2013.01); *G06Q 10/0631* (2013.01); *G06Q 10/10* (2013.01)

(58) Field of Classification Search
CPC ... G06F 9/4881; G06Q 10/0631; G06Q 10/10
See application file for complete search history.

(56) References Cited

U.S. PATENT DOCUMENTS 4,899,161 A    2/1990 Morin et al.
4,958,305 A    9/1990 Piazza
(Continued)

FOREIGN PATENT DOCUMENTS

AU    2012216622    5/2015
AU    2014201599    1/2018
(Continued)

OTHER PUBLICATIONS

Stack Overflow, How to use update trigger to update another table, 2011, 6 pages.*

(Continued)

*Primary Examiner* — Diem K Cao
(74) *Attorney, Agent, or Firm* — Hickman Palermo Becker Bingham LLP

(57) ABSTRACT

Activities related to data analyses are managed in part using task objects representing tasks that need to be performed. In one embodiment, a method comprises: receiving a first request to generate a task object that describes a task; responsive to the first request, generating the task object, the task object being a data structure that comprises values for task object fields that represent attributes of the task; identifying, in a repository of data objects, a particular data object to associate with the task object; determining that a first field of the task object fields corresponds to a second field of the particular data object, the second field of the particular data object having a particular value; and assigning the first field of the task object to the particular value of the corresponding second field. In another embodiment, task objects are associated with geolocation data, and mapped or otherwise presented accordingly.

19 Claims, 13 Drawing Sheets

(51) Int. Cl.
*G06Q 10/06* (2012.01)
*G06Q 10/10* (2012.01)

(56) References Cited

U.S. PATENT DOCUMENTS

| | | |
|---|---|---|
| 5,021,792 A | 6/1991 | Hwang |
| 5,109,399 A | 4/1992 | Thompson |
| 5,329,108 A | 7/1994 | Lamoure |
| 5,555,503 A | 9/1996 | Kyrtsos et al. |
| 5,631,981 A | 5/1997 | Rao |
| 5,632,009 A | 5/1997 | Rao et al. |
| 5,670,987 A | 9/1997 | Doi et al. |
| 5,754,182 A | 5/1998 | Kobayashi |
| 5,781,195 A | 7/1998 | Marvin |
| 5,781,704 A | 7/1998 | Rossmo |
| 5,798,769 A | 8/1998 | Chiu et al. |
| 5,845,300 A | 12/1998 | Comer |
| 5,904,727 A * | 5/1999 | Prabhakaran ......... G08G 1/127 340/990 |
| 6,057,757 A | 5/2000 | Arrowsmith et al. |
| 6,091,956 A | 7/2000 | Hollenberg |
| 6,141,659 A | 10/2000 | Barker et al. |
| 6,157,747 A | 12/2000 | Szeliski et al. |
| 6,161,098 A | 12/2000 | Wallman |
| 6,173,067 B1 | 1/2001 | Payton et al. |
| 6,178,432 B1 | 1/2001 | Cook et al. |
| 6,189,003 B1 | 2/2001 | Leal |
| 6,219,053 B1 | 4/2001 | Tachibana et al. |
| 6,232,971 B1 | 5/2001 | Haynes |
| 6,247,019 B1 | 6/2001 | Davies |
| 6,272,489 B1 | 8/2001 | Rauch et al. |
| 6,279,018 B1 | 8/2001 | Kudrolli et al. |
| 6,341,310 B1 | 1/2002 | Leshem et al. |
| 6,366,933 B1 | 4/2002 | Ball et al. |
| 6,369,835 B1 | 4/2002 | Lin |
| 6,389,289 B1 | 5/2002 | Voce et al. |
| 6,414,683 B1 | 7/2002 | Gueziec |
| 6,456,997 B1 | 9/2002 | Shukla |
| 6,483,509 B1 | 11/2002 | Rabenhorst |
| 6,529,900 B1 | 3/2003 | Patterson et al. |
| 6,549,944 B1 | 4/2003 | Weinberg et al. |
| 6,560,620 B1 | 5/2003 | Ching |
| 6,581,068 B1 | 6/2003 | Bensoussan et al. |
| 6,594,672 B1 | 7/2003 | Lampson et al. |
| 6,631,496 B1 | 10/2003 | Li et al. |
| 6,642,945 B1 | 11/2003 | Sharpe |
| 6,662,103 B1 | 12/2003 | Skolnick et al. |
| 6,674,434 B1 | 1/2004 | Chojnacki et al. |
| 6,714,936 B1 | 3/2004 | Nevin, III |
| 6,757,445 B1 | 6/2004 | Knopp |
| 6,775,675 B1 | 8/2004 | Nwabueze et al. |
| 6,820,135 B1 | 11/2004 | Dingman |
| 6,828,920 B2 | 12/2004 | Owen et al. |
| 6,839,745 B1 | 1/2005 | Dingari et al. |
| 6,877,137 B1 | 4/2005 | Rivette et al. |
| 6,976,210 B1 | 12/2005 | Silva et al. |
| 6,980,984 B1 | 12/2005 | Huffman et al. |
| 6,985,950 B1 | 1/2006 | Hanson et al. |
| 7,036,085 B2 | 4/2006 | Barros |
| 7,043,702 B2 | 5/2006 | Chi et al. |
| 7,055,110 B2 | 5/2006 | Kupka et al. |
| 7,113,964 B1 | 9/2006 | Bequet et al. |
| 7,139,800 B2 | 11/2006 | Bellotti et al. |
| 7,158,797 B1 | 1/2007 | Jayaraman et al. |
| 7,158,878 B2 | 1/2007 | Rasmussen et al. |
| 7,162,475 B2 | 1/2007 | Ackerman |
| 7,168,039 B2 | 1/2007 | Bertram |
| 7,171,427 B2 | 1/2007 | Witowski et al. |
| 7,188,100 B2 | 3/2007 | De Bellis et al. |
| 7,269,786 B1 | 9/2007 | Malloy et al. |
| 7,278,105 B1 | 10/2007 | Kitts |
| 7,290,698 B2 | 11/2007 | Poslinski et al. |
| 7,333,998 B2 | 2/2008 | Heckerman et al. |
| 7,370,047 B2 | 5/2008 | Gorman |
| 7,375,732 B2 | 5/2008 | Arcas |
| 7,379,811 B2 | 5/2008 | Rasmussen et al. |
| 7,379,903 B2 | 5/2008 | Caballero et al. |
| 7,383,053 B2 | 6/2008 | Kent et al. |
| 7,426,654 B2 | 9/2008 | Adams et al. |
| 7,441,182 B2 | 10/2008 | Beilinson et al. |
| 7,454,466 B2 | 11/2008 | Bellotti et al. |
| 7,457,706 B2 | 11/2008 | Malero et al. |
| 7,467,375 B2 | 12/2008 | Tondreau et al. |
| 7,487,139 B2 | 2/2009 | Fraleigh et al. |
| 7,502,786 B2 | 3/2009 | Liu et al. |
| 7,519,470 B2 | 4/2009 | Brasche et al. |
| 7,523,100 B1 | 4/2009 | Bionda et al. |
| 7,525,422 B2 | 4/2009 | Bishop et al. |
| 7,529,195 B2 | 5/2009 | Gorman |
| 7,529,727 B2 | 5/2009 | Arning et al. |
| 7,529,734 B2 | 5/2009 | Dirisala |
| 7,533,008 B2 | 5/2009 | Mangino et al. |
| 7,539,666 B2 | 5/2009 | Ashworth et al. |
| 7,558,677 B2 | 6/2009 | Jones |
| 7,574,409 B2 | 8/2009 | Patinkin |
| 7,574,428 B2 | 8/2009 | Leiserowitz et al. |
| 7,579,965 B2 | 8/2009 | Bucholz |
| 7,596,285 B2 | 9/2009 | Brown et al. |
| 7,614,006 B2 | 11/2009 | Molander |
| 7,617,232 B2 | 11/2009 | Gabbert et al. |
| 7,617,314 B1 | 11/2009 | Bansod et al. |
| 7,620,628 B2 | 11/2009 | Kapur et al. |
| 7,627,812 B2 | 12/2009 | Chamberlain et al. |
| 7,634,717 B2 | 12/2009 | Chamberlain et al. |
| 7,652,622 B2 | 1/2010 | Hansen et al. |
| 7,663,621 B1 | 2/2010 | Allen et al. |
| 7,703,021 B1 | 4/2010 | Flam |
| 7,706,817 B2 | 4/2010 | Bamrah et al. |
| 7,712,049 B2 | 5/2010 | Williams et al. |
| 7,716,077 B1 | 5/2010 | Mikurak |
| 7,725,530 B2 | 5/2010 | Sah et al. |
| 7,725,547 B2 | 5/2010 | Albertson et al. |
| 7,730,082 B2 | 6/2010 | Sah et al. |
| 7,730,109 B2 | 6/2010 | Rohrs et al. |
| 7,747,648 B1 | 6/2010 | Kraft et al. |
| 7,760,969 B2 | 7/2010 | Silverbrook et al. |
| 7,770,100 B2 | 8/2010 | Chamberlain et al. |
| 7,791,616 B2 | 9/2010 | Ioup et al. |
| 7,805,457 B1 | 9/2010 | Viola et al. |
| 7,809,703 B2 | 10/2010 | Balabhadrapatruni et al. |
| 7,818,291 B2 | 10/2010 | Ferguson et al. |
| 7,818,658 B2 | 10/2010 | Chen |
| 7,870,493 B2 | 1/2011 | Pall et al. |
| 7,872,647 B2 | 1/2011 | Mayer et al. |
| 7,894,984 B2 | 2/2011 | Rasmussen et al. |
| 7,899,611 B2 | 3/2011 | Downs et al. |
| 7,917,376 B2 | 3/2011 | Bellin et al. |
| 7,920,963 B2 | 4/2011 | Jouline et al. |
| 7,933,862 B2 | 4/2011 | Chamberlain et al. |
| 7,945,470 B1 | 5/2011 | Cohen et al. |
| 7,945,852 B1 | 5/2011 | Pilskains |
| 7,962,281 B2 | 6/2011 | Rasmussen et al. |
| 7,962,495 B2 | 6/2011 | Jain et al. |
| 7,962,848 B2 | 6/2011 | Bertram |
| 7,970,240 B1 | 6/2011 | Chao et al. |
| 7,971,150 B2 | 6/2011 | Raskutti et al. |
| 7,984,374 B2 | 6/2011 | Caro et al. |
| 7,971,784 B2 | 7/2011 | Lapstun |
| 8,001,465 B2 | 8/2011 | Kudrolli et al. |
| 8,001,482 B2 | 8/2011 | Bhattiprolu et al. |
| 8,010,545 B2 | 8/2011 | Stefik et al. |
| 8,015,487 B2 | 9/2011 | Roy et al. |
| 8,024,778 B2 | 9/2011 | Cash et al. |
| 8,028,894 B2 | 10/2011 | Lapstun et al. |
| 8,036,632 B1 | 10/2011 | Cona et al. |
| 8,042,110 B1 | 10/2011 | Kawahara et al. |
| 8,065,080 B2 | 11/2011 | Koch |
| 8,085,268 B2 | 12/2011 | Carrino et al. |
| 8,103,543 B1 | 1/2012 | Zwicky |
| 8,134,457 B2 | 3/2012 | Velipasalar et al. |
| 8,145,703 B2 | 3/2012 | Frishert et al. |
| 8,185,819 B2 | 5/2012 | Sah et al. |
| 8,196,184 B2 | 6/2012 | Amirov et al. |
| 8,200,676 B2 | 6/2012 | Frank |

(56) References Cited

U.S. PATENT DOCUMENTS

| | | |
|---|---|---|
| 8,214,361 B1 | 7/2012 | Sandler et al. |
| 8,214,764 B2 | 7/2012 | Gemmell et al. |
| 8,225,201 B2 | 7/2012 | Michael |
| 8,229,947 B2 | 7/2012 | Fujinaga |
| 8,230,333 B2 | 7/2012 | Decherd et al. |
| 8,271,461 B2 | 9/2012 | Pike et al. |
| 8,280,880 B1 | 10/2012 | Aymeloglu et al. |
| 8,285,725 B2 | 10/2012 | Bayliss |
| 8,290,926 B2 | 10/2012 | Ozzie et al. |
| 8,290,942 B2 | 10/2012 | Jones et al. |
| 8,290,943 B2 | 10/2012 | Carbone et al. |
| 8,301,464 B1 | 10/2012 | Cave et al. |
| 8,301,904 B1 | 10/2012 | Gryaznov |
| 8,312,367 B2 | 11/2012 | Foster |
| 8,312,546 B2 | 11/2012 | Alme |
| 8,325,178 B1 | 12/2012 | Doyle, Jr. |
| 8,352,881 B2 | 1/2013 | Champion et al. |
| 8,368,695 B2 | 2/2013 | Howell et al. |
| 8,397,171 B2 | 3/2013 | Klassen et al. |
| 8,400,448 B1 | 3/2013 | Doyle, Jr. |
| 8,402,047 B1 | 3/2013 | Mangini et al. |
| 8,407,180 B1 | 3/2013 | Ramesh et al. |
| 8,412,234 B1 | 4/2013 | Gatmir-Motahari et al. |
| 8,412,707 B1 | 4/2013 | Mianji |
| 8,422,825 B1 | 4/2013 | Neophytou et al. |
| 8,447,722 B1 | 5/2013 | Ahuja et al. |
| 8,452,790 B1 | 5/2013 | Mianji |
| 8,463,036 B1 | 6/2013 | Ramesh et al. |
| 8,477,994 B1 | 7/2013 | Noshadi |
| 8,489,331 B2 | 7/2013 | Kopf et al. |
| 8,489,641 B1 | 7/2013 | Seefeld et al. |
| 8,498,984 B1 | 7/2013 | Hwang et al. |
| 8,508,533 B2 | 8/2013 | Cervelli et al. |
| 8,510,743 B2 | 8/2013 | Hackborn et al. |
| 8,514,082 B2 | 8/2013 | Cova et al. |
| 8,514,229 B2 | 8/2013 | Cervelli et al. |
| 8,515,207 B2 | 8/2013 | Chau |
| 8,521,135 B2 | 8/2013 | Cryderman |
| 8,554,579 B2 | 10/2013 | Tribble et al. |
| 8,554,653 B2 | 10/2013 | Falkenborg et al. |
| 8,554,709 B2 | 10/2013 | Goodson et al. |
| 8,564,596 B2 | 10/2013 | Carrino et al. |
| 8,577,911 B1 | 11/2013 | Stepinski et al. |
| 8,589,273 B2 | 11/2013 | Creeden et al. |
| 8,595,234 B2 | 11/2013 | Siripuapu et al. |
| 8,620,641 B2 | 12/2013 | Farnsworth et al. |
| 8,639,757 B1 | 1/2014 | Zang et al. |
| 8,646,080 B2 | 2/2014 | Williamson et al. |
| 8,676,857 B1 | 3/2014 | Adams et al. |
| 8,688,069 B1 | 4/2014 | Cazanas et al. |
| 8,689,108 B1 | 4/2014 | Duffield et al. |
| 8,713,467 B1 | 4/2014 | Goldenberg et al. |
| 8,726,379 B1 | 5/2014 | Stiansen et al. |
| 8,739,059 B2 | 5/2014 | Rabenold et al. |
| 8,739,278 B2 | 5/2014 | Varghese |
| 8,742,934 B1 | 6/2014 | Sarpy et al. |
| 8,744,890 B1 | 6/2014 | Bernier |
| 8,745,516 B2 | 6/2014 | Mason et al. |
| 8,762,870 B2 | 6/2014 | Robotham et al. |
| 8,781,169 B2 | 7/2014 | Jackson et al. |
| 8,787,939 B2 | 7/2014 | Papakipos et al. |
| 8,788,407 B1 | 7/2014 | Singh et al. |
| 8,799,799 B1 | 8/2014 | Cervelli et al. |
| 8,812,960 B1 | 8/2014 | Sun et al. |
| 8,830,322 B2 | 9/2014 | Nerayoff et al. |
| 8,832,594 B1 | 9/2014 | Thompson et al. |
| 8,849,254 B2 | 9/2014 | Bolon |
| 8,868,537 B1 | 10/2014 | Colgrove et al. |
| 8,917,274 B2 | 12/2014 | Ma et al. |
| 8,924,872 B1 | 12/2014 | Bogomolov et al. |
| 8,937,619 B2 | 1/2015 | Sharma et al. |
| 8,938,686 B1 | 1/2015 | Erenrich et al. |
| 8,949,164 B1 | 2/2015 | Mohler |
| 8,983,494 B1 | 3/2015 | Onnen et al. |
| 9,009,171 B1 | 4/2015 | Grossman et al. |
| 9,009,827 B1 | 4/2015 | Albertson et al. |
| 9,021,260 B1 | 4/2015 | Falk et al. |
| 9,021,384 B1 | 4/2015 | Beard et al. |
| 9,037,407 B2 | 5/2015 | Thompson |
| 9,043,696 B1 | 5/2015 | Meiklejohn et al. |
| 9,043,894 B1 | 5/2015 | Dennison et al. |
| 9,104,695 B1 | 8/2015 | Cervelli et al. |
| 9,111,380 B2 | 8/2015 | Piemonte et al. |
| 9,116,975 B2 | 8/2015 | Shankar et al. |
| 9,123,086 B1 | 9/2015 | Freeland et al. |
| 9,262,529 B2 | 2/2016 | Colgrove et al. |
| 9,275,069 B1 | 3/2016 | Garrod et al. |
| 9,301,103 B1 | 3/2016 | Thompson |
| 9,313,233 B2 | 4/2016 | Sprague et al. |
| 9,380,431 B1 | 6/2016 | Freeland et al. |
| 9,674,662 B2 | 6/2017 | Freeland et al. |
| 9,727,376 B1 | 8/2017 | Bills et al. |
| 2002/0003539 A1 | 1/2002 | Abe |
| 2002/0033848 A1 | 3/2002 | Sciammarella et al. |
| 2002/0065708 A1 | 5/2002 | Senay et al. |
| 2002/0091707 A1 | 7/2002 | Keller |
| 2002/0095658 A1 | 7/2002 | Shulman |
| 2002/0116120 A1 | 8/2002 | Ruiz et al. |
| 2002/0130867 A1 | 9/2002 | Yang et al. |
| 2002/0174201 A1 | 11/2002 | Ramer et al. |
| 2002/0194119 A1 | 12/2002 | Wright et al. |
| 2003/0028560 A1 | 2/2003 | Kudrolli et al. |
| 2003/0039948 A1 | 2/2003 | Donahue |
| 2003/0052896 A1 | 3/2003 | Higgins et al. |
| 2003/0061211 A1 | 3/2003 | Shultz et al. |
| 2003/0103049 A1 | 6/2003 | Kindratenko et al. |
| 2003/0140106 A1 | 7/2003 | Raguseo |
| 2003/0144868 A1 | 7/2003 | MacIntyre et al. |
| 2003/0152277 A1 | 8/2003 | Hall et al. |
| 2003/0163352 A1 | 8/2003 | Surpin et al. |
| 2003/0225755 A1 | 12/2003 | Iwayama et al. |
| 2003/0227746 A1 | 12/2003 | Sato |
| 2003/0229848 A1 | 12/2003 | Arend et al. |
| 2004/0030492 A1 | 2/2004 | Fox et al. |
| 2004/0032432 A1 | 2/2004 | Baynger |
| 2004/0039498 A1 | 2/2004 | Ollis et al. |
| 2004/0064256 A1 | 4/2004 | Barinek et al. |
| 2004/0085318 A1 | 5/2004 | Hassler et al. |
| 2004/0095349 A1 | 5/2004 | Bito et al. |
| 2004/0098236 A1 | 5/2004 | Mayer et al. |
| 2004/0103124 A1 | 5/2004 | Kupkova |
| 2004/0111410 A1 | 6/2004 | Burgoon et al. |
| 2004/0126840 A1 | 7/2004 | Cheng et al. |
| 2004/0143602 A1 | 7/2004 | Ruiz et al. |
| 2004/0143796 A1 | 7/2004 | Lerner et al. |
| 2004/0163039 A1 | 8/2004 | McPherson et al. |
| 2004/0193600 A1 | 9/2004 | Kaasten et al. |
| 2004/0203380 A1 | 10/2004 | Hamdi et al. |
| 2004/0221223 A1 | 11/2004 | Yu et al. |
| 2004/0260702 A1 | 12/2004 | Cragun et al. |
| 2004/0267746 A1 | 12/2004 | Marcjan et al. |
| 2005/0015377 A1* | 1/2005 | Wan .............. G06F 16/254 |
| 2005/0027705 A1 | 2/2005 | Sadri et al. |
| 2005/0028094 A1 | 2/2005 | Allyn |
| 2005/0031197 A1 | 2/2005 | Knopp |
| 2005/0034062 A1 | 2/2005 | Bufkin et al. |
| 2005/0039119 A1 | 2/2005 | Parks et al. |
| 2005/0065811 A1 | 3/2005 | Chu et al. |
| 2005/0080769 A1 | 4/2005 | Gemmell |
| 2005/0086207 A1 | 4/2005 | Heuer et al. |
| 2005/0125436 A1 | 6/2005 | Mudunuri et al. |
| 2005/0125715 A1 | 6/2005 | Franco et al. |
| 2005/0143096 A1 | 6/2005 | Boesch |
| 2005/0143602 A1 | 6/2005 | Yada et al. |
| 2005/0162523 A1 | 7/2005 | Darrell et al. |
| 2005/0166144 A1 | 7/2005 | Gross |
| 2005/0180330 A1 | 8/2005 | Shapiro |
| 2005/0182793 A1 | 8/2005 | Keenan et al. |
| 2005/0183005 A1 | 8/2005 | Denoue et al. |
| 2005/0210409 A1 | 9/2005 | Jou |
| 2005/0246327 A1 | 11/2005 | Yeung et al. |
| 2005/0251786 A1 | 11/2005 | Citron et al. |
| 2005/0267652 A1 | 12/2005 | Allstadt et al. |
| 2006/0026120 A1 | 2/2006 | Carolan et al. |

(56) References Cited

U.S. PATENT DOCUMENTS

| | | |
|---|---|---|
| 2006/0026170 A1 | 2/2006 | Kreitler et al. |
| 2006/0053096 A1 | 3/2006 | Subramanian et al. |
| 2006/0059139 A1 | 3/2006 | Robinson |
| 2006/0074881 A1 | 4/2006 | Vembu et al. |
| 2006/0080619 A1 | 4/2006 | Carlson et al. |
| 2006/0093222 A1 | 5/2006 | Saffer et al. |
| 2006/0116991 A1 | 6/2006 | Calderwood |
| 2006/0129746 A1 | 6/2006 | Porter |
| 2006/0139375 A1 | 6/2006 | Rasmussen et al. |
| 2006/0142949 A1 | 6/2006 | Helt |
| 2006/0143034 A1 | 6/2006 | Rothermel |
| 2006/0146050 A1 | 7/2006 | Yamauchi |
| 2006/0149596 A1 | 7/2006 | Surpin et al. |
| 2006/0161558 A1 | 7/2006 | Tamma et al. |
| 2006/0161568 A1 | 7/2006 | Dettinger et al. |
| 2006/0203337 A1 | 9/2006 | White |
| 2006/0206235 A1 | 9/2006 | Shakes et al. |
| 2006/0218637 A1 | 9/2006 | Thomas et al. |
| 2006/0241974 A1 | 10/2006 | Chao et al. |
| 2006/0242040 A1 | 10/2006 | Rader et al. |
| 2006/0242630 A1 | 10/2006 | Koike et al. |
| 2006/0250764 A1 | 11/2006 | Howarth et al. |
| 2006/0251307 A1 | 11/2006 | Florin et al. |
| 2006/0259527 A1 | 11/2006 | Devarakonda et al. |
| 2006/0271277 A1 | 11/2006 | Hu et al. |
| 2006/0279630 A1 | 12/2006 | Aggarwal et al. |
| 2007/0011150 A1 | 1/2007 | Frank |
| 2007/0016363 A1 | 1/2007 | Huang et al. |
| 2007/0024620 A1 | 2/2007 | Muller-Fischer et al. |
| 2007/0038646 A1 | 2/2007 | Thota |
| 2007/0038962 A1 | 2/2007 | Fuchs et al. |
| 2007/0043744 A1 | 2/2007 | Carro |
| 2007/0057966 A1 | 3/2007 | Ohno et al. |
| 2007/0072591 A1 | 3/2007 | McGary et al. |
| 2007/0078832 A1 | 4/2007 | Ott et al. |
| 2007/0083541 A1 | 4/2007 | Fraleigh et al. |
| 2007/0088596 A1 | 4/2007 | Berkelhamer et al. |
| 2007/0094389 A1 | 4/2007 | Nussey et al. |
| 2007/0115373 A1 | 5/2007 | Gallagher et al. |
| 2007/0118547 A1 | 5/2007 | Gupta et al. |
| 2007/0130541 A1 | 6/2007 | Louch et al. |
| 2007/0150369 A1 | 6/2007 | Zivin |
| 2007/0150520 A1 | 6/2007 | Bennett et al. |
| 2007/0174760 A1 | 7/2007 | Chamberlain et al. |
| 2007/0188516 A1 | 8/2007 | Loup et al. |
| 2007/0192265 A1 | 8/2007 | Chopin et al. |
| 2007/0198571 A1* | 8/2007 | Ferguson ............ G06F 16/2428 |
| 2007/0208497 A1 | 9/2007 | Downs et al. |
| 2007/0208498 A1 | 9/2007 | Barker et al. |
| 2007/0208736 A1 | 9/2007 | Tanigawa et al. |
| 2007/0233709 A1 | 10/2007 | Abnous |
| 2007/0240062 A1 | 10/2007 | Christena et al. |
| 2007/0250491 A1 | 10/2007 | Olszak et al. |
| 2007/0252491 A1 | 10/2007 | Olszak et al. |
| 2007/0258642 A1 | 11/2007 | Thota |
| 2007/0266336 A1 | 11/2007 | Nojima et al. |
| 2007/0294643 A1 | 12/2007 | Kyle |
| 2008/0007618 A1 | 1/2008 | Yuasa |
| 2008/0010605 A1 | 1/2008 | Frank |
| 2008/0025629 A1 | 1/2008 | Obrador et al. |
| 2008/0040684 A1 | 2/2008 | Crump |
| 2008/0051989 A1 | 2/2008 | Welsh |
| 2008/0052142 A1 | 2/2008 | Bailey et al. |
| 2008/0077597 A1 | 3/2008 | Butler |
| 2008/0077642 A1 | 3/2008 | Carbone et al. |
| 2008/0082486 A1 | 4/2008 | Lermant et al. |
| 2008/0082578 A1 | 4/2008 | Hogue et al. |
| 2008/0098085 A1 | 4/2008 | Krane et al. |
| 2008/0104019 A1 | 5/2008 | Nath |
| 2008/0114809 A1* | 5/2008 | MacBeth ............ G06F 16/248 |
| 2008/0126951 A1 | 5/2008 | Sood et al. |
| 2008/0155440 A1 | 6/2008 | Trevor et al. |
| 2008/0162616 A1 | 7/2008 | Gross et al. |
| 2008/0163073 A1 | 7/2008 | Becker et al. |
| 2008/0164998 A1* | 7/2008 | Scherpbier ............ G16H 40/20 340/539.13 |
| 2008/0192053 A1 | 8/2008 | Howell et al. |
| 2008/0195417 A1 | 8/2008 | Surpin et al. |
| 2008/0195608 A1 | 8/2008 | Clover |
| 2008/0208844 A1 | 8/2008 | Jenkins |
| 2008/0222295 A1 | 9/2008 | Robinson et al. |
| 2008/0223834 A1 | 9/2008 | Griffiths et al. |
| 2008/0227473 A1 | 9/2008 | Haney |
| 2008/0229056 A1 | 9/2008 | Agarwal et al. |
| 2008/0252419 A1 | 10/2008 | Batchelor et al. |
| 2008/0255973 A1 | 10/2008 | El Wade et al. |
| 2008/0263468 A1 | 10/2008 | Cappione et al. |
| 2008/0267107 A1 | 10/2008 | Rosenberg |
| 2008/0270468 A1 | 10/2008 | Mao |
| 2008/0276167 A1 | 11/2008 | Michael |
| 2008/0278311 A1 | 11/2008 | Grange et al. |
| 2008/0288306 A1 | 11/2008 | MacIntyre et al. |
| 2008/0294678 A1 | 11/2008 | Gorman et al. |
| 2008/0301559 A1* | 12/2008 | Martinsen ............ G06F 9/451 715/710 |
| 2008/0301643 A1 | 12/2008 | Appleton et al. |
| 2008/0313281 A1 | 12/2008 | Scheidl et al. |
| 2009/0002492 A1 | 1/2009 | Velipasalar et al. |
| 2009/0005070 A1 | 1/2009 | Forstall et al. |
| 2009/0006471 A1 | 1/2009 | Richardson et al. |
| 2009/0006474 A1 | 1/2009 | Richardson et al. |
| 2009/0027418 A1 | 1/2009 | Maru et al. |
| 2009/0030915 A1 | 1/2009 | Winter et al. |
| 2009/0037912 A1* | 2/2009 | Stoitsev ............ G06F 9/45512 718/100 |
| 2009/0055251 A1 | 2/2009 | Shah et al. |
| 2009/0088964 A1 | 4/2009 | Schaaf et al. |
| 2009/0100018 A1 | 4/2009 | Roberts |
| 2009/0115786 A1 | 5/2009 | Shmiasaki et al. |
| 2009/0119309 A1 | 5/2009 | Gibson et al. |
| 2009/0119578 A1 | 5/2009 | Relya et al. |
| 2009/0125369 A1 | 5/2009 | Kloosstra et al. |
| 2009/0125459 A1 | 5/2009 | Norton et al. |
| 2009/0132921 A1 | 5/2009 | Hwangbo et al. |
| 2009/0132953 A1 | 5/2009 | Reed et al. |
| 2009/0138790 A1 | 5/2009 | Larcheveque et al. |
| 2009/0143052 A1 | 6/2009 | Bates et al. |
| 2009/0144262 A1 | 6/2009 | White et al. |
| 2009/0144274 A1 | 6/2009 | Fraleigh et al. |
| 2009/0156231 A1 | 6/2009 | Versteeg et al. |
| 2009/0158185 A1 | 6/2009 | Lacevic et al. |
| 2009/0164934 A1 | 6/2009 | Bhattiprolu et al. |
| 2009/0171939 A1 | 7/2009 | Athsani et al. |
| 2009/0172511 A1 | 7/2009 | Decherd et al. |
| 2009/0177962 A1 | 7/2009 | Gusmorino et al. |
| 2009/0179892 A1 | 7/2009 | Tsuda et al. |
| 2009/0187464 A1 | 7/2009 | Bai et al. |
| 2009/0222400 A1 | 9/2009 | Kupershmidt et al. |
| 2009/0222759 A1 | 9/2009 | Drieschner |
| 2009/0222760 A1 | 9/2009 | Halverson et al. |
| 2009/0234720 A1 | 9/2009 | George et al. |
| 2009/0249244 A1 | 10/2009 | Robinson et al. |
| 2009/0265105 A1 | 10/2009 | Davis et al. |
| 2009/0281839 A1 | 11/2009 | Lynn et al. |
| 2009/0287470 A1 | 11/2009 | Farnsworth et al. |
| 2009/0292626 A1 | 11/2009 | Oxford |
| 2009/0315679 A1 | 12/2009 | Bauchot et al. |
| 2010/0004857 A1 | 1/2010 | Pereira et al. |
| 2010/0011282 A1 | 1/2010 | Dollard et al. |
| 2010/0042922 A1 | 2/2010 | Bradateanu et al. |
| 2010/0057716 A1 | 3/2010 | Stefik et al. |
| 2010/0058212 A1 | 3/2010 | Belitz et al. |
| 2010/0063961 A1 | 3/2010 | Guiheneuf et al. |
| 2010/0070523 A1 | 3/2010 | Delgo et al. |
| 2010/0070842 A1 | 3/2010 | Aymeloglu et al. |
| 2010/0070845 A1 | 3/2010 | Facemire et al. |
| 2010/0070897 A1 | 3/2010 | Aymeloglu et al. |
| 2010/0073315 A1 | 3/2010 | Lee et al. |
| 2010/0076968 A1 | 3/2010 | Boyns et al. |
| 2010/0082842 A1 | 4/2010 | Lavrov et al. |
| 2010/0100963 A1 | 4/2010 | Mahaffey |
| 2010/0103124 A1 | 4/2010 | Kruzeniski et al. |
| 2010/0106420 A1 | 4/2010 | Mattikalli et al. |

(56) References Cited

U.S. PATENT DOCUMENTS

| | | |
|---|---|---|
| 2010/0114817 A1 | 5/2010 | Broeder et al. |
| 2010/0114887 A1 | 5/2010 | Conway et al. |
| 2010/0121817 A1 | 5/2010 | Meyer et al. |
| 2010/0122152 A1 | 5/2010 | Chamberlain et al. |
| 2010/0131457 A1 | 5/2010 | Heimendinger |
| 2010/0162176 A1 | 6/2010 | Dunton |
| 2010/0173619 A1 | 7/2010 | Hua et al. |
| 2010/0185984 A1 | 7/2010 | Wright et al. |
| 2010/0191563 A1 | 7/2010 | Schlaifer et al. |
| 2010/0191884 A1 | 7/2010 | Holenstein et al. |
| 2010/0198684 A1 | 8/2010 | Eraker et al. |
| 2010/0199225 A1 | 8/2010 | Coleman et al. |
| 2010/0214117 A1 | 8/2010 | Hazzani |
| 2010/0223543 A1 | 9/2010 | Marston |
| 2010/0228812 A1 | 9/2010 | Uomini |
| 2010/0235322 A1* | 9/2010 | Kuruganti ............ H04L 67/1095 707/610 |
| 2010/0250412 A1 | 9/2010 | Wagner |
| 2010/0277611 A1 | 11/2010 | Holt et al. |
| 2010/0280857 A1 | 11/2010 | Liu et al. |
| 2010/0281458 A1 | 11/2010 | Paladino et al. |
| 2010/0293174 A1 | 11/2010 | Bennett et al. |
| 2010/0306713 A1 | 12/2010 | Geisner et al. |
| 2010/0313119 A1 | 12/2010 | Baldwin et al. |
| 2010/0318924 A1 | 12/2010 | Frankel et al. |
| 2010/0321399 A1 | 12/2010 | Ellren et al. |
| 2010/0325526 A1 | 12/2010 | Ellis et al. |
| 2010/0325581 A1 | 12/2010 | Finkelstein et al. |
| 2010/0330801 A1 | 12/2010 | Rouh |
| 2011/0022312 A1 | 1/2011 | McDonough et al. |
| 2011/0029526 A1 | 2/2011 | Knight et al. |
| 2011/0047159 A1 | 2/2011 | Baid et al. |
| 2011/0060753 A1 | 3/2011 | Shaked et al. |
| 2011/0061013 A1 | 3/2011 | Bilicki et al. |
| 2011/0066933 A1 | 3/2011 | Ludwig |
| 2011/0074811 A1 | 3/2011 | Hanson et al. |
| 2011/0078055 A1 | 3/2011 | Faribault et al. |
| 2011/0078173 A1 | 3/2011 | Seligmann et al. |
| 2011/0093327 A1 | 4/2011 | Fordyce et al. |
| 2011/0093440 A1 | 4/2011 | Asakura et al. |
| 2011/0111786 A1 | 5/2011 | Rao |
| 2011/0117878 A1 | 5/2011 | Barash et al. |
| 2011/0119100 A1 | 5/2011 | Ruhl et al. |
| 2011/0137766 A1 | 6/2011 | Rasmussen et al. |
| 2011/0153384 A1 | 6/2011 | Horne et al. |
| 2011/0158469 A1 | 6/2011 | Mastykarz |
| 2011/0161096 A1 | 6/2011 | Buehler et al. |
| 2011/0167105 A1 | 7/2011 | Ramakrishnan et al. |
| 2011/0170799 A1 | 7/2011 | Carrino et al. |
| 2011/0173032 A1 | 7/2011 | Payne et al. |
| 2011/0185316 A1 | 7/2011 | Reid et al. |
| 2011/0202557 A1 | 8/2011 | Atsmon et al. |
| 2011/0208724 A1 | 8/2011 | Jones et al. |
| 2011/0213655 A1 | 9/2011 | Henkin |
| 2011/0218934 A1 | 9/2011 | Elser |
| 2011/0219450 A1 | 9/2011 | McDougal et al. |
| 2011/0225198 A1 | 9/2011 | Edwards et al. |
| 2011/0238495 A1 | 9/2011 | Kang |
| 2011/0238553 A1 | 9/2011 | Raj et al. |
| 2011/0251951 A1 | 10/2011 | Kolkowtiz |
| 2011/0258158 A1 | 10/2011 | Resende et al. |
| 2011/0270705 A1 | 11/2011 | Parker |
| 2011/0276423 A1 | 11/2011 | Davidson |
| 2011/0289397 A1 | 11/2011 | Eastmond et al. |
| 2011/0289407 A1 | 11/2011 | Naik et al. |
| 2011/0289420 A1 | 11/2011 | Morioka et al. |
| 2011/0291851 A1 | 12/2011 | Whisenant |
| 2011/0310005 A1 | 12/2011 | Chen et al. |
| 2011/0314007 A1 | 12/2011 | Dassa et al. |
| 2012/0010812 A1 | 1/2012 | Thompson |
| 2012/0014560 A1 | 1/2012 | Obrador et al. |
| 2012/0015673 A1 | 1/2012 | Klassen et al. |
| 2012/0019559 A1 | 1/2012 | Siler et al. |
| 2012/0032975 A1 | 2/2012 | Koch |
| 2012/0036013 A1 | 2/2012 | Neuhaus et al. |
| 2012/0036434 A1 | 2/2012 | Oberstein |
| 2012/0050293 A1 | 3/2012 | Carlhian et al. |
| 2012/0066296 A1 | 3/2012 | Appleton et al. |
| 2012/0072825 A1 | 3/2012 | Sherkin et al. |
| 2012/0079363 A1 | 3/2012 | Folting et al. |
| 2012/0084118 A1 | 4/2012 | Bai et al. |
| 2012/0095797 A1* | 4/2012 | Nishimura ........ G06Q 10/06311 705/7.13 |
| 2012/0106801 A1 | 5/2012 | Jackson |
| 2012/0117082 A1 | 5/2012 | Koperda et al. |
| 2012/0131512 A1 | 5/2012 | Takeuchi et al. |
| 2012/0137235 A1 | 5/2012 | Ts et al. |
| 2012/0144335 A1 | 6/2012 | Abeln et al. |
| 2012/0150578 A1 | 6/2012 | Mangat et al. |
| 2012/0159307 A1 | 6/2012 | Chung et al. |
| 2012/0159362 A1 | 6/2012 | Brown et al. |
| 2012/0159363 A1 | 6/2012 | DeBacker et al. |
| 2012/0159399 A1 | 6/2012 | Bastide et al. |
| 2012/0166929 A1 | 6/2012 | Henderson et al. |
| 2012/0170847 A1 | 7/2012 | Tsukidate |
| 2012/0173985 A1 | 7/2012 | Peppel |
| 2012/0180002 A1 | 7/2012 | Campbell et al. |
| 2012/0196557 A1 | 8/2012 | Reich et al. |
| 2012/0196558 A1 | 8/2012 | Reich et al. |
| 2012/0203708 A1 | 8/2012 | Psota et al. |
| 2012/0206469 A1 | 8/2012 | Hulubei et al. |
| 2012/0208636 A1 | 8/2012 | Feige |
| 2012/0216106 A1 | 8/2012 | Casey |
| 2012/0221511 A1 | 8/2012 | Gibson et al. |
| 2012/0221553 A1 | 8/2012 | Wittmer et al. |
| 2012/0221580 A1 | 8/2012 | Barney |
| 2012/0245976 A1 | 9/2012 | Kumar et al. |
| 2012/0246148 A1 | 9/2012 | Dror |
| 2012/0254129 A1 | 10/2012 | Wheeler et al. |
| 2012/0268269 A1 | 10/2012 | Doyle |
| 2012/0277914 A1 | 11/2012 | Crow et al. |
| 2012/0284345 A1 | 11/2012 | Costenaro et al. |
| 2012/0290879 A1 | 11/2012 | Shibuya et al. |
| 2012/0296907 A1 | 11/2012 | Long et al. |
| 2012/0311684 A1 | 12/2012 | Paulsen et al. |
| 2012/0317202 A1* | 12/2012 | Lewis ...................... G01S 19/17 709/204 |
| 2012/0323888 A1 | 12/2012 | Osann, Jr. |
| 2012/0330973 A1 | 12/2012 | Ghuneim et al. |
| 2013/0005362 A1 | 1/2013 | Borghei |
| 2013/0006426 A1 | 1/2013 | Healey et al. |
| 2013/0006725 A1 | 1/2013 | Simanek et al. |
| 2013/0006916 A1 | 1/2013 | McBride et al. |
| 2013/0013642 A1 | 1/2013 | Klein et al. |
| 2013/0018796 A1 | 1/2013 | Kolhatkar et al. |
| 2013/0021445 A1 | 1/2013 | Cossette-Pacheco et al. |
| 2013/0024268 A1 | 1/2013 | Manickavelu |
| 2013/0046635 A1 | 2/2013 | Grigg et al. |
| 2013/0046842 A1 | 2/2013 | Muntz et al. |
| 2013/0057551 A1 | 3/2013 | Ebert et al. |
| 2013/0060786 A1 | 3/2013 | Serrano et al. |
| 2013/0061169 A1 | 3/2013 | Pearcy et al. |
| 2013/0073377 A1 | 3/2013 | Heath |
| 2013/0073454 A1 | 3/2013 | Busch |
| 2013/0078943 A1 | 3/2013 | Biage et al. |
| 2013/0086482 A1 | 4/2013 | Parsons |
| 2013/0097482 A1 | 4/2013 | Marantz et al. |
| 2013/0110822 A1 | 5/2013 | Ikeda et al. |
| 2013/0110877 A1 | 5/2013 | Bonham et al. |
| 2013/0111320 A1 | 5/2013 | Campbell et al. |
| 2013/0117651 A1 | 5/2013 | Waldman et al. |
| 2013/0101159 A1 | 6/2013 | Rosen |
| 2013/0143597 A1 | 6/2013 | Mitsuya et al. |
| 2013/0150004 A1 | 6/2013 | Rosen |
| 2013/0151148 A1 | 6/2013 | Parundekar et al. |
| 2013/0151388 A1 | 6/2013 | Falkenborg et al. |
| 2013/0157234 A1 | 6/2013 | Gulli et al. |
| 2013/0165069 A1 | 6/2013 | Nitta et al. |
| 2013/0166550 A1 | 6/2013 | Buchmann et al. |
| 2013/0176321 A1 | 7/2013 | Mitchell et al. |
| 2013/0179420 A1 | 7/2013 | Park et al. |
| 2013/0196614 A1 | 8/2013 | Pahlevani |
| 2013/0224696 A1 | 8/2013 | Wolfe et al. |
| 2013/0225212 A1 | 8/2013 | Khan |

(56) References Cited

U.S. PATENT DOCUMENTS

| | | |
|---|---|---|
| 2013/0226318 A1 | 8/2013 | Procyk |
| 2013/0226953 A1 | 8/2013 | Markovich et al. |
| 2013/0232045 A1 | 9/2013 | Tai |
| 2013/0235749 A1 | 9/2013 | Cho et al. |
| 2013/0238616 A1 | 9/2013 | Rose et al. |
| 2013/0246170 A1 | 9/2013 | Gross et al. |
| 2013/0251233 A1 | 9/2013 | Yang et al. |
| 2013/0262171 A1 | 10/2013 | Solodko et al. |
| 2013/0262497 A1 | 10/2013 | Case et al. |
| 2013/0262527 A1 | 10/2013 | Hunter et al. |
| 2013/0262528 A1 | 10/2013 | Foit |
| 2013/0263019 A1 | 10/2013 | Castellanos et al. |
| 2013/0267207 A1 | 10/2013 | Hao et al. |
| 2013/0268520 A1 | 10/2013 | Fisher et al. |
| 2013/0279757 A1 | 10/2013 | Kephart |
| 2013/0282696 A1 | 10/2013 | John et al. |
| 2013/0288719 A1 | 10/2013 | Alonzo |
| 2013/0290011 A1 | 10/2013 | Lynn et al. |
| 2013/0290825 A1 | 10/2013 | Arndt et al. |
| 2013/0295970 A1 | 11/2013 | Sheshadri et al. |
| 2013/0297619 A1 | 11/2013 | Chandarsekaran et al. |
| 2013/0311375 A1 | 11/2013 | Priebatsch |
| 2014/0012616 A1* | 1/2014 | Moshenek ..... G06Q 10/063114 705/7.15 |
| 2014/0019936 A1 | 1/2014 | Cohanoff |
| 2014/0032506 A1 | 1/2014 | Hoey et al. |
| 2014/0033010 A1 | 1/2014 | Richardt et al. |
| 2014/0040371 A1 | 2/2014 | Gurevich et al. |
| 2014/0047319 A1 | 2/2014 | Eberlein |
| 2014/0047357 A1 | 2/2014 | Alfaro et al. |
| 2014/0059038 A1 | 2/2014 | McPherson et al. |
| 2014/0067611 A1 | 3/2014 | Adachi et al. |
| 2014/0068487 A1 | 3/2014 | Steiger et al. |
| 2014/0074855 A1 | 3/2014 | Zhao et al. |
| 2014/0079340 A1 | 3/2014 | Kawano |
| 2014/0081685 A1* | 3/2014 | Thacker .................. G06Q 10/06 705/7.12 |
| 2014/0093174 A1 | 4/2014 | Zhang et al. |
| 2014/0095273 A1 | 4/2014 | Tang et al. |
| 2014/0095509 A1 | 4/2014 | Patton |
| 2014/0108068 A1 | 4/2014 | Williams |
| 2014/0108380 A1 | 4/2014 | Gotz et al. |
| 2014/0108985 A1 | 4/2014 | Scott et al. |
| 2014/0129261 A1 | 5/2014 | Bothwell et al. |
| 2014/0137003 A1* | 5/2014 | Peters .................. G06Q 10/101 715/758 |
| 2014/0149436 A1 | 5/2014 | Bahrami et al. |
| 2014/0156527 A1 | 6/2014 | Grigg et al. |
| 2014/0157172 A1 | 6/2014 | Peery et al. |
| 2014/0164502 A1 | 6/2014 | Khodorenko et al. |
| 2014/0176606 A1 | 6/2014 | Narayan et al. |
| 2014/0189536 A1 | 7/2014 | Lange et al. |
| 2014/0195515 A1 | 7/2014 | Baker et al. |
| 2014/0195887 A1 | 7/2014 | Ellis et al. |
| 2014/0214579 A1 | 7/2014 | Shen et al. |
| 2014/0222521 A1 | 8/2014 | Chait |
| 2014/0244329 A1* | 8/2014 | Urban .............. G06Q 10/06311 705/7.15 |
| 2014/0244388 A1 | 8/2014 | Manouchehri et al. |
| 2014/0258827 A1 | 9/2014 | Gormish et al. |
| 2014/0267294 A1 | 9/2014 | Ma |
| 2014/0267295 A1 | 9/2014 | Sharma |
| 2014/0279824 A1 | 9/2014 | Tamayo |
| 2014/0279865 A1 | 9/2014 | Kumar |
| 2014/0283383 A1 | | |
| 2014/0304582 A1 | 10/2014 | Aiuto et al. |
| 2014/0304582 A1 | 10/2014 | Bills et al. |
| 2014/0310266 A1 | 10/2014 | Greenfield |
| 2014/0316911 A1 | 10/2014 | Gross |
| 2014/0333651 A1 | 11/2014 | Cervelli et al. |
| 2014/0337772 A1 | 11/2014 | Cervelli et al. |
| 2014/0344230 A1 | 11/2014 | Krause et al. |
| 2014/0357299 A1 | 12/2014 | Xu et al. |
| 2014/0358252 A1 | 12/2014 | Ellsworth et al. |
| 2014/0361899 A1 | 12/2014 | Layson |
| 2015/0005014 A1 | 1/2015 | Huang et al. |
| 2015/0006214 A1* | 1/2015 | Lavoie ............ G06Q 10/06311 705/7.17 |
| 2015/0019394 A1 | 1/2015 | Unser et al. |
| 2015/0029176 A1 | 1/2015 | Baxter et al. |
| 2015/0046870 A1 | 2/2015 | Goldenberg et al. |
| 2015/0080012 A1 | 3/2015 | Sprague et al. |
| 2015/0089424 A1 | 3/2015 | Duffield et al. |
| 2015/0100897 A1 | 4/2015 | Sun et al. |
| 2015/0100907 A1 | 4/2015 | Erenrich et al. |
| 2015/0134633 A1 | 5/2015 | Colgrove et al. |
| 2015/0134666 A1 | 5/2015 | Gattiker et al. |
| 2015/0149227 A1* | 5/2015 | Sar ................. G06Q 10/063114 705/7.15 |
| 2015/0169709 A1 | 6/2015 | Kara et al. |
| 2015/0169726 A1 | 6/2015 | Kara et al. |
| 2015/0170077 A1 | 6/2015 | Kara et al. |
| 2015/0178821 A1 | 6/2015 | Huerta |
| 2015/0178825 A1 | 6/2015 | Huerta |
| 2015/0178877 A1 | 6/2015 | Bogomolov et al. |
| 2015/0186821 A1 | 7/2015 | Wang et al. |
| 2015/0187036 A1 | 7/2015 | Wang et al. |
| 2015/0199641 A1* | 7/2015 | Napoli ............. G06Q 10/06311 705/7.15 |
| 2015/0227295 A1 | 8/2015 | Meiklejohn et al. |
| 2015/0331919 A1 | 11/2015 | Freeland et al. |
| 2016/0110458 A1 | 4/2016 | Colgrove et al. |
| 2016/0249170 A1 | 8/2016 | Freeland et al. |
| 2017/0132200 A1 | 5/2017 | Noland et al. |
| 2017/0257743 A1 | 9/2017 | Freeland et al. |
| 2018/0084383 A1 | 3/2018 | Freeland |
| 2018/0239747 A1 | 8/2018 | Bills et al. |
| 2019/0026368 A1 | 1/2019 | Colgrove et al. |

FOREIGN PATENT DOCUMENTS

| | | |
|---|---|---|
| DE | 102014103482 | 9/2014 |
| DE | 102013222023 | 1/2015 |
| DE | 102014215621 | 2/2015 |
| EP | 0 763 201 | 3/1997 |
| EP | 1 672 527 | 6/2006 |
| EP | 2400448 | 12/2011 |
| EP | 2551799 | 1/2013 |
| EP | 2560134 | 2/2013 |
| EP | 2 575 107 | 4/2013 |
| EP | 2778977 | 9/2014 |
| EP | 2816513 | 12/2014 |
| EP | 2835745 | 2/2015 |
| EP | 2835770 | 2/2015 |
| EP | 2838039 | 2/2015 |
| EP | 2846241 | 3/2015 |
| EP | 2851852 | 3/2015 |
| EP | 2858014 | 4/2015 |
| EP | 2858018 | 4/2015 |
| EP | 2863326 | 4/2015 |
| EP | 2863346 | 4/2015 |
| EP | 2869211 | 5/2015 |
| EP | 2881868 | 6/2015 |
| EP | 2884439 | 6/2015 |
| EP | 2884440 | 6/2015 |
| EP | 2891992 | 7/2015 |
| EP | 2911078 | 8/2015 |
| EP | 2911100 | 8/2015 |
| EP | 2916276 | 9/2015 |
| GB | 2516155 | 1/2015 |
| GB | 2518745 | 4/2015 |
| NL | 2012778 | 11/2014 |
| NL | 2013306 | 2/2015 |
| NZ | 624557 | 12/2014 |
| WO | WO 95/032424 | 11/1995 |
| WO | WO 2000/009529 | 2/2000 |
| WO | WO 2001/098925 | 12/2001 |
| WO | WO 2002/065353 | 8/2002 |
| WO | WO 2004/038548 | 5/2004 |
| WO | WO 2004/057268 | 7/2004 |
| WO | WO 2005/013200 | 2/2005 |
| WO | WO 2005/104736 | 11/2005 |
| WO | WO 2008/064207 | 5/2008 |
| WO | WO 2009/061501 | 5/2009 |
| WO | WO 2009/123975 | 10/2009 |

(56) References Cited

FOREIGN PATENT DOCUMENTS

| WO | WO 2010/000014 | 1/2010 |
|---|---|---|
| WO | WO 2010/030913 | 3/2010 |
| WO | WO 2011/058507 | 5/2011 |
| WO | WO 2013/010157 | 1/2013 |
| WO | WO 2013/102892 | 7/2013 |

OTHER PUBLICATIONS

Official Communication for European Patent Application No. 14180321.3 dated Apr. 17, 2015.
Official Communication for Australian Patent Application No. 2014201511 dated Feb. 27, 2015.
Official Commuincation for Australian Patent Application No. 2014202442 dated Mar. 19, 2015.
Official Communication for Great Britain Patent Application No. 1404457.2 dated Aug. 14, 2014.
Hansen et al., "Analyzing Social Media Networks with NodeXL: Insights from a Connected World", Chapter 4, pp. 53-67 and Chapter 10, pp. 143-164, published Sep. 2010.
Official Communication for New Zealand Patent Application No. 628263 dated Aug. 12, 2014.
Gesher, Ari, "Palantir Screenshots in the Wild: Swing Sightings," The Palantir Blog, Sep. 11, 2007, pp. 1-12.
Official Communication for European Patent Application No. 15155846.7 dated Jul. 8, 2015.
Palmas et al., "An Edge-Bunding Layout for Interactive Parallel Coordinates" 2014 IEEE Pacific Visualization Symposium, pp. 57-64.
Manske, "File Saving Dialogs," <http://www.mozilla.org/editor/ui_specs/FileSaveDialogs.html>, Jan. 20, 1999, pp. 7.
Huang et al., "Systematic and Integrative Analysis of Large Gene Lists Using DAVID Bioinformatics Resources," Nature Protocols, 4.1, 2008, 44-57.
Definition "Identify", downloaded Jan. 22, 2015, 1 page.
Official Communication for European Patent Application No. 14180142.3 dated Feb. 6, 2015.
Microsoft—Developer Network, "Getting Started with VBA in Word 2010," Apr. 2010, <http://msdn.microsoft.com/en-us/library/ff604039%28v=office.14%29.aspx> as printed Apr. 4, 2014 in 17 pages.
Bugzilla@Mozilla, "Bug 18726—[feature] Long-click means of invoking contextual menus not supported," http://bugzilla.mozilla.org/show_bug.cgi?id=18726 printed Jun. 13, 2013 in 11 pages.
Official Communication for Netherlands Patent Application No. 2013306 dated Apr. 24, 2015.
"A Quick Guide to UniProtKB Swiss-Prot & TrEMBL," Sep. 2011, pp. 2.
Chen et al., "Bringing Order to the Web: Automatically Categorizing Search Results," CHI 2000, Proceedings of the SIGCHI conference on Human Factors in Computing Systems, Apr. 1-6, 2000, The Hague, The Netherlands, pp. 145-152.
Official Communication for European Patent Application No. 14187996.5 dated Feb. 12, 2015.
Keylines.com, "An Introduction to KeyLines and Network Visualization," Mar. 2014, <http://keylines.com/wp-content/uploads/2014/03/KeyLines-White-Paper.pdf> downloaded May 12, 2014 in 8 pages.
Dramowicz, Ela, "Retail Trade Area Analysis Using the Huff Model," Directions Magazine, Jul. 2, 2005 in 10 pages, http://www.directionsmag.com/articles/retail-trade-area-analysis-using-the-huff-model/123411.
Official Communication for European Patent Application No. 14158861.6 dated Jun. 16, 2014.
Yang et al., "HTML Page Analysis Based on Visual Cues", A129, pp. 859-864, 2001.
Li et al., "Interactive Multimodal Visual Search on Mobile Device," IEEE Transactions on Multimedia, vol. 15, No. 3, Apr. 1, 2013, pp. 594-607.

Official Communication for Australian Patent Application No. 2014210614 dated Jun. 5, 2015.
Official Communication for European Patent Application No. 14159464.8 dated Oct. 8, 2014.
Kitts, Paul, "Chapter 14: Genome Assembly and Annotation Process," The NCBI Handbook, Oct. 2002, pp. 1-21.
Official Communication for European Patent Application No. 14159464.8 dated Jul. 31, 2014.
Rouse, Margaret, "OLAP Cube," <http://searchdatamanagement.techtarget.com/definition/OLAP-cube>, Apr. 28, 2012, pp. 16.
Goswami, Gautam, "Quite Writly Said!," One Brick at a Time, Aug. 21, 2005, pp. 7.
Conner, Nancy, "Google Apps: The Missing Manual," May 1, 2008, pp. 15.
Olanoff, Drew, "Deep Dive with the New Google Maps for Desktop with Google Earth Integration, It's More than Just a Utility," May 15, 2013, pp. 1-6, retrieved from the internet: http://web.archive.org/web/20130515230641/http://techcrunch.com/2013/05/15/deep-dive-with-the-new-google-maps-for-desktop-with-google-earth-integration-its-more-than-just-a-utility/.
Official Communication for New Zealand Patent Application No. 628840 dated Aug. 28, 2014.
Map of San Jose, CA. Retrieved Oct. 2. 2013 from http://maps.bing.com.
Official Communication for Great Britain Patent Application No. 1413935.6 dated Jan. 27, 2015.
Official Communication for European Patent Application No. 14159464.8 dated Sep. 22, 2014.
Official Communication for Australian Patent Application No. 2014250678 dated Jun. 17, 2015.
Griffith, Daniel A., "A Generalized Huff Model," Geographical Analysis, Apr. 1982, vol. 14, No. 2, pp. 135-144.
Kahan et al., "Annotea: an Open RDF Infrastructure for Shared Web Annotations", Computer Networks, Elsevier Science Publishers B.V., vol. 39, No. 5, dated Aug. 5, 2002, pp. 589-608.
Official Communication for Australian Patent Application No. 2014213553 dated May 7, 2015.
Official Communication for New Zealand Patent Application No. 622513 dated Aug. 3, 2014.
Nierman, "Evaluating Structural Similarity in XML Documents", 6 pages, 2002.
Official Communication for European Patent Application No. 14191540.5 dated May 27, 2015.
Official Communication for European Patent Application No. 14186225.0 dated Feb. 13, 2015.
Ananiev et al., "The New Modality API," http://web.archive.org/web/20061211011958/http://java.sun.com/developer/technicalArticles/J2SE/Desktop/javase6/modality/ Jan. 21, 2006, pp. 8.
Chung, Chin-Wan, "Dataplex: An Access to Heterogeneous Distributed Databases," Communications of the ACM, Association for Computing Machinery, Inc., vol. 33, No. 1, Jan. 1, 1990, pp. 70-80.
Official Communication for New Zealand Patent Application No. 627962 dated Aug. 5, 2014.
"A Word About Banks and the Laundering of Drug Money," Aug. 18, 2012, http://www.golemxiv.co.uk/2012/08/a-word-about-banks-and-the-laundering-of-drug-money/.
Official Communication for Great Britain Patent Application No. 1404574.4 dated Dec. 18, 2014.
"Potential Money Laundering Warning Signs," snapshot taken 2003, https://web.archive.org/web/20030816090055/http:/finsolinc.com/ANTI-MONEY%20LAUNDERING%20TRAINING%20GUIDES.pdf.
Official Communciation for Great Britain Patent Application No. 1411984.6 dated Dec. 22, 2014.
GIS-NET 3 Public _ Department of Regional Planning. Planning & Zoning Information for Unincorporated LA County. Retrieved Oct. 2, 2013 from http://gis.planning.lacounty.gov/GIS-NET3_Public/Viewer.html.
Microsoft Office—Visio, "About connecting shapes," <http://office.microsoft.com/en-us/visio-help/about-connecting-shapes-HP085050369.aspx> printed Aug. 4, 2011 in 6 pages.
Official Communication for European Patent Application No. 14189802.3 dated May 11, 2015.

(56) References Cited

OTHER PUBLICATIONS

Official Communication for European Patent Application No. 14189344.6 dated Feb. 20, 2015.
Definition "Overlay", downloaded Jan. 22, 2015, 1 page.
Map of San Jose, CA. Retrieved Oct. 2, 2013 from http://maps.yahoo.com.
Manno et al., "Introducing Collaboration in Single-user Applications through the Centralized Control Architecture," 2010, pp. 10.
Boyce, Jim, "Microsoft Outlook 2010 Inside Out," Aug. 1, 2010, retrieved from the internet https://capdtron.files.wordpress.com/2013/01/outlook-2010-inside_out.pdf.
Wikipedia, "Federated Database System," Sep. 7, 2013, retrieved from the internet on Jan. 27, 2015 http://en.wikipedia.org/w/index.php?title=Federated_database_system&oldid=571954221.
Official Communication for European Patent Application No. 14197895.7 dated Apr. 28, 2015.
Official Communication for European Patent Application No. 14199182.8 dated Mar. 13, 2015.
Huff et al., "Calibrating the Huff Model Using ArcGIS Business Analyst," ESRI, Sep. 2008, pp. 33.
Official Communication for New Zealand Patent Application No. 624557 dated May 14, 2014.
Acklen, Laura, "Absolute Beginner's Guide to Microsoft Word 2003," Dec. 24, 2003, pp. 15-18, 34-41, 308-316.
Celik, Tantek, "CSS Basic User Interface Module Level 3 (CSS3 UI)," Section 8 Resizing and Overflow, Jan. 17, 2012, retrieved from internet http://www.w3.org/TR/2012/WD-css3-ui-20120117/#resizing-amp-overflow retrieved on.
Liu, Tianshun, "Combining GIS and the Huff Model to Analyze Suitable Locations for a New Asian Supermarket in the Minneapolis and St. Paul, Minnesota USA," Papers in Resource Analysis, 2012, vol. 14, pp. 8.
Official Communication for New Zealand Patent Application No. 622517 dated Apr. 3, 2014.
Keylines.com, "Visualizing Threats: Improved Cyber Security Through Network Visualization," Apr. 2014, <http://keylines.com/wp-content/uploads/2014/04/Visualizing-Threats1.pdf> downloaded May 12, 2014 in 10 pages.
Official Communication for European Patent Application No. 14189347.9 dated Mar. 4, 2015.
Keylines.com, "KeyLines Datasheet," Mar. 2014, <http://keylines.com/wp-content/uploads/2014/03/KeyLines-datasheet.pdf> downloaded May 12, 2014 in 2.
Official Communication for New Zealand Patent Application No. 628495 dated Aug. 19, 2014.
Umagandhi et al., "Search Query Recommendations Using Hybrid User Profile with Query Logs," International Journal of Computer Applications, vol. 80, No. 10, Oct. 1, 2013, pp. 7-18.
Official Communication for New Zealand Patent Application No. 628161 dated Aug. 25, 2014.
Huff, David L., "Parameter Estimation in the Huff Model," ESRI, ArcUser, Oct.-Dec. 2003, pp. 34-36.
Hogue et al., "Thresher: Automating the Unwrapping of Semantic Content from the World Wide Web," 14th International Conference on World Wide Web, WWW 2005: Chiba, Japan, May 10-14, 2005, pp. 86-95.
Canese et al., "Chapter 2: PubMed: The Bibliographic Database," The NCBI Handbook, Oct. 2002, pp. 1-10.
"Refresh CSS Ellipsis When Resizing Container—Stack Overflow," Jul. 31, 2013, retrieved from internet http://stackoverflow.com/questions/17964681/refresh-css-ellipsis-when-resizing-container, retrieved on May 18, 2015.
Thompson, Mick, "Getting Started with GEO," Getting Started with GEO, Jul. 26, 2011.
Delcher et al., "Identifying Bacterial Genes and Endosymbiont DNA with Glimmer," BioInformatics, vol. 23, No. 6, 2007, pp. 673-679.
Hardesty, "Privacy Challenges: Analysis: It's Surprisingly Easy to Identify Individuals from Credit-Card Metadata," MIT News on Campus and Around the World, MIT News Office, Jan. 29, 2015, 3 pages.
Official Communication for New Zealand Patent Application No. 628585 dated Aug. 26, 2014.
Bluttman et al., "Excel Formulas and Functions for Dummies," 2005, Wiley Publishing, Inc., pp. 280, 284-286.
Official Communication for European Patent Application No. 14180432.8 dated Jun. 23, 2015.
IBM, "Determining Business Object Structure," IBM, 2004, 9 pages.
Official Communication for European Patent Application No. 14180281.9 dated Jan. 26, 2015.
Hibbert et al., "Prediction of Shopping Behavior Using a Huff Model Within a GIS Framework," Healthy Eating in Context, Mar. 18, 2011, pp. 16.
Sirotkin et al., "Chapter 13: The Processing of Biological Sequence Data at NCBI," The NCBI Handbook, Oct. 2002, pp. 1-11.
Madden, Tom, "Chapter 16: The BLAST Sequence Analysis Tool," The NCBI Handbook, Oct. 2002, pp. 1-15.
Microsoft Office—Visio, "Add and glue connectors with the Connector tool," <http://office.microsoft.com/en-us/visio-help/add-and-glue-connectors-with-the-connector-tool-HA010048532.aspx?CTT=1> printed Aug. 4, 2011 in 1 page.
Map of San Jose, CA. Retrieved Oct. 2, 2013 from http://maps.google.com.
Notice of Acceptance for Australian Patent Application No. 2014250678 dated Oct. 7, 2015.
Official Communication for Great Britain Patent Application No. 1408025.3 dated Nov. 6, 2014.
"A First Look: Predicting Market Demand for Food Retail using a Huff Analysis," TRF Policy Solutions, Jul. 2012, pp. 30.
Amnet, "5 Great Tools for Visualizing Your Twitter Followers," posted Aug. 4, 2010, http://www.amnetblog.com/component/content/article/115-5-grate-tools-for-visualizing-your-twitter-followers.html.
Sigrist, et al., "PROSITE, a Protein Domain Database for Functional Characterization and Annotation," Nucleic Acids Research, 2010, vol. 38, pp. D161-D166.
"The FASTA Program Package," fasta-36.3.4, Mar. 25, 2011, pp. 29.
Mizrachi, Ilene, "Chapter 1: GenBank: The Nuckeotide Sequence Database," The NCBI Handbook, Oct. 2002, pp. 1-14.
Office Communication for New Zealand Patent Application No. 35215130 dated Apr. 1, 2014.
Official Communication for European Patent Application No. 14159447.3 dated Jan. 8, 2015.
Stack Overflow, How to Use Update Trigger to Update Another Table, dated May 2012, 2 pages.
Official Communication for European Application No. 14159447.3 dated Sep. 28, 2016.
Official communication for Europe Patent Application No. 14159447.3 dated Nov. 25, 2014.
Official communication for Europe Patent Application No. 15157642.8 dated Apr. 13, 2017.
Official Communication for New Zealand Patent Application No. 622501 dated Jun. 5, 2014.
Official communication for Europe Patent Application No. 15157642.8 dated Jul. 20, 2015.
Official Communication for New Zealand Patent Application No. 622501 dated Apr. 1, 2014.
U.S. Appl. No. 13/247,987, filed Sep. 28, 2011, Office Action, dated Apr. 2, 2015.
U.S. Appl. No. 13/831,791, filed Mar. 15, 2013, Office Action, dated Mar. 4, 2015.
U.S. Appl. No. 13/835,688, filed Mar. 15, 2013, First Office Action Interview, dated Jun. 17, 2015.
U.S. Appl. No. 14/102,394, filed Dec. 10, 2013, Notice of Allowance, dated Aug. 25, 2014.
U.S. Appl. No. 14/108,187, filed Dec. 16, 2013, Notice of Allowance, dated Aug. 29, 2014.

(56) References Cited

OTHER PUBLICATIONS

U.S. Appl. No. 14/135,289, filed Dec. 19, 2013, Notice of Allowance, dated Oct. 14, 2014.
U.S. Appl. No. 14/148,568, filed Jan. 6, 2014, Office Action, dated Oct. 22, 2014.
U.S. Appl. No. 14/148,568, filed Jan. 6, 2014, Office Action, dated Mar. 26, 2015.
U.S. Appl. No. 14/192,767, filed Feb. 27, 2014, Notice of Allowance, dated Dec. 16, 2014.
U.S. Appl. No. 14/225,006, filed Mar. 25, 2014, First Office Action Interview, dated Sep. 10, 2014.
U.S. Appl. No. 14/225,084, filed Mar. 25, 2014, First Office Action Interview, dated Sep. 2, 2014.
U.S. Appl. No. 14/225,084, filed Mar. 25, 2014, Notice of Allowance, dated May 4, 2015.
U.S. Appl. No. 14/225,084, filed Mar. 25, 2014, First Office Action Interview, dated Feb. 20, 2015.
U.S. Appl. No. 14/225,160, filed Mar. 25, 2014, Final Office Action, dated Feb. 11, 2015.
U.S. Appl. No. 14/225,160, filed Mar. 25, 2014, Advisory Action, dated May 20, 2015.
U.S. Appl. No. 14/225,160, filed Mar. 25, 2014, First Office Action Interview, dated Oct. 22, 2014.
U.S. Appl. No. 14/268,964, filed May 2, 2014, First Office Action Interview, dated Sep. 3, 2014.
U.S. Appl. No. 14/268,964, filed May 2, 2014, Notice of Allowance, dated Dec. 3, 2014.
U.S. Appl. No. 14/289,596, filed May 28, 2014, First Office Action Interview, dated Jul. 18, 2014.
U.S. Appl. No. 14/289,596, filed May 28, 2014, Final Office Action, dated Jan. 26, 2015.
U.S. Appl. No. 14/289,599, filed May 28, 2014, First Office Action Interview, dated Jul. 22, 2014.
U.S. Appl. No. 14/289,599, filed May 28, 2014, Final Office Action, dated May 29, 2015.
U.S. Appl. No. 14/294,098, filed Jun. 2, 2014, Final Office Action, dated Nov. 6, 2014.
U.S. Appl. No. 14/294,098, filed Jun. 2, 2014, First Office Action Interview, dated Aug. 15, 2014.
U.S. Appl. No. 14/294,098, filed Jun. 2, 2014, Notice of Allowance, dated Dec. 29, 2014.
U.S. Appl. No. 14/306,138, filed Jun. 16, 2014, Final Office Action, dated Feb. 18, 2015.
U.S. Appl. No. 14/306,138, filed Jun. 16, 2014, First Office Action Interview, dated Sep. 23, 2014.
U.S. Appl. No. 14/306,138, filed Jun. 16, 2014, Office Action, dated May 26, 2015.
U.S. Appl. No. 14/306,147, filed Jun. 16, 2014, First Office Action Interview, dated Sep. 9, 2014.
U.S. Appl. No. 14/306,147, filed Jun. 16, 2014, Final Office Action, dated Feb. 19, 2015.
U.S. Appl. No. 14/306,154, filed Jun. 16, 2014, First Office Action Interview, dated Sep. 9, 2014.
U.S. Appl. No. 14/306,154, filed Jun. 16, 2014, Final Office Action, dated Mar. 11, 2015.
U.S. Appl. No. 14/306,154, filed Jun. 16, 2014, Advisory Action, dated May 15, 2015.
U.S. Appl. No. 14/319,765, filed Jun. 30, 2014, First Office Action Interview, dated Feb. 4, 2015.
U.S. Appl. No. 14/319,765, filed Jun. 30, 2014, First Office Action Interview, dated Nov. 25, 2014.
U.S. Appl. No.14/323,935, filed Jul. 3, 2014, Office Action, dated Jun. 22, 2015.
U.S. Appl. No. 14/323,395, filed Jul. 3, 2014, First Office Action Interview, dated Nov. 28, 2014.
U.S. Appl. No. 14/323,935, filed Jul. 3, 2014, First Office Action Interview, dated Mar. 31, 2015.
U.S. Appl. No. 14/326,738, filed Jul. 9, 2014, First Office Action Interview, dated Dec. 2, 2014.
U.S. Appl. No. 14/326,738, filed Jul. 9, 2014, First Office Action Interview, dated Mar. 31, 2015.
U.S. Appl. No. 14/473,552, filed Aug. 29, 2014, Interview Summary, dated Feb. 24, 2015.
U.S. Appl. No. 14/486,991, filed Sep. 15, 2014, Office Action, dated Mar. 10, 2015.
U.S. Appl. No. 14/504,103, filed Oct. 1, 2014, First Office Action Interview, dated Feb. 5, 2015.
U.S. Appl. No. 14/504,103, filed Oct. 1, 2014, Notice of Allowance, dated May 18, 2015.
U.S. Appl. No. 14/504,103, filed Oct. 1, 2014, First Office Action Interview, dated Mar. 31, 2015.
U.S. Appl. No. 14/579,752, filed Dec. 22, 2014, First Office Action Interview, dated May 26, 2015.
U.S. Appl. No. 14/616,080, filed Feb. 6, 2015, Notice of Allowance, dated Apr. 2, 2015.
U.S. Appl. No. 14/639,606, filed Mar. 5, 2015, First Office Action Interview, dated May 18, 2015.
U.S. Appl. No. 14/639,606, filed Mar. 5, 2015, First Action Interview, dated Jul. 24, 2015.
U.S. Appl. No. 14/306,147, filed Jun. 16, 2014, Office Action, dated Aug. 7, 2015.
U.S. Appl. No. 14/225,006, filed Mar. 25, 2014, Final Office Action, dated Sep. 2, 2015.
U.S. Appl. No. 13/836,815, filed Mar. 15, 2013, Office Action, dated Oct. 24, 2015.
U.S. Appl. No. 14/579,752, filed Dec. 22, 2014, Final Office Action, dated Aug. 19, 2015.
U.S. Appl. No. 13/839,026, filed Mar. 15, 2013, Notice of Allowance, dated Jul. 6, 2015.
U.S. Appl. No. 14/306,154, filed Jun. 16, 2014, Office Action, dated Jul. 6, 2015.
U.S. Appl. No. 14/473,860, filed Aug. 29, 2014, Notice of Allowance, dated Jan. 5, 2015.
U.S. Appl. No. 13/831,199, filed Mar. 14, 2013, Office Action, dated May 9, 2016.
U.S. Appl. No. 14/460,905, filed Apr. 20, 2015, Office Action, dated Oct. 7, 2015.
U.S. Appl. No. 14/225,160, filed Mar. 25, 2014, Office Action, dated Aug. 12, 2015.
U.S. Appl. No. 13/831,199, filed Mar. 14, 2013, Final Office Action, dated Nov. 4, 2016.
U.S. Appl. No. 14/490,612, filed Sep. 18, 2014, Final Office Action, dated Aug. 18, 2015.
U.S. Appl. No. 14/486,991, filed Sep. 15, 2014, Notice of Allowance, dated May 1, 2015.
U.S. Appl. No. 14/027,118, filed Feb. 4, 2016, Notice of Allowance, dated Apr. 4, 2016.
U.S. Appl. No. 15/047,405, filed Feb. 18, 2016, Office Action, dated Apr. 1, 2016.
U.S. Appl. No. 14/726,353, filed May 29, 2015, First Office Action Interview, dated Sep. 10, 2015.
U.S. Appl. No. 13/247,987, filed Sep. 28, 2011, Office Action, dated Sep. 22, 2015.
U.S. Appl. No. 12/556,318, filed Sep. 9, 2009, Office Action, dated Jul. 2, 2015.
U.S. Appl. No. 14/487,342, filed Sep. 16, 2014, Notice of Allowance, dated Sep. 23, 2015.
U.S. Appl. No. 14/027,118, filed Feb. 4, 2016, Office Action, dated Sep. 16, 2015.
U.S. Appl. No. 14/631,633, filed Feb. 25, 2015, First Office Action Interview, dated Sep. 10, 2015.
U.S. Appl. No. 14/077,159, filed May 3, 2016, Office Action, dated Mar. 12, 2014.
U.S. Appl. No. 15/145,177, filed May 3, 2016, Office Action, dated Jul. 29, 2016.
U.S. Appl. No. 15/145,177, filed May 3, 2016, Final Office Action, dated Aug. 7, 2015.
U.S. Appl. No. 14/319,765, filed Jun. 30, 2014, Advisory Action, dated Sep. 10, 2015.
U.S. Appl. No. 14/077,159, filed Nov. 11, 2013, Notice of Allowance, dated Aug. 15, 2014.

(56) References Cited

OTHER PUBLICATIONS

U.S. Appl. No. 14/225,084, filed Mar. 25, 2014, Office Action, dated Sep. 11, 2015.
U.S. Appl. No. 14/088,251, filed Nov. 22, 2013, Office Action, dated Aug. 26, 2015.
U.S. Appl. No. 14/196,814, filed Mar. 4, 2014, Final Office Action, dated Jun. 13, 2016.
U.S. Appl. No. 14/134,558, filed Dec. 19, 2013, Office Action, dated Oct. 7, 2016.
U.S. Appl. No. 13/831,791, filed Mar. 15, 2013, Final Office Action, dated Aug. 6, 2015.
U.S. Appl. No. 13/831,199, filed Mar. 14, 2013, Office Action, dated May 19, 2017.
U.S. Appl. No. 13/831,199, filed Mar. 14, 2013, Notice of Allowance, dated Jan. 2, 2018.
U.S. Appl. No. 14/196,814, filed Mar. 4, 2014, Office Action, dated Dec. 14, 2016.
U.S. Appl. No. 13/831,199, filed Mar. 14, 2013, Final Office Action, dated Oct. 6, 2015.
U.S. Appl. No. 13/831,199, filed Mar. 14, 2013, Office Action, dated Jun. 3, 2015.
U.S. Appl. No. 14/487,342, filed Sep. 16, 2014, First Office Action, dated Apr. 23, 2015.
U.S. Appl. No. 14/806,517, filed Jul. 22, 2015, First Office Action, dated Oct. 26, 2016.
U.S. Appl. No. 14/088,251, filed Nov. 22, 2013, Office Action, dated Feb. 12, 2015.
U.S. Appl. No. 14/196,814, filed Mar. 4, 2014, First Office Action Interview, dated Apr. 16, 2014.
U.S. Appl. No. 14/875,536, filed Oct. 5, 2015, First Office Action Interview, dated Nov. 16, 2017.
U.S. Appl. No. 14/196,814, filed Mar. 4, 2014, Final Office Action, dated Dec. 18, 2014.
U.S. Appl. No. 14/334,232, filed Jul. 17, 2014, Notice of Allowance, dated Nov. 10, 2015.
U.S. Appl. No. 14/225,006, filed Mar. 25, 2014, First Office Action Interview, dated Feb. 27, 2015.
U.S. Appl. No. 13/838,815, filed Mar. 15, 2013, Office Action, dated Oct. 24, 2014.
U.S. Appl. No. 14/985,201, filed Dec. 30, 2015, First Office Action Interview, dated Jun. 15, 2017.
U.S. Appl. No. 14/196,814, filed Mar. 4, 2014, Notice of Allowance, dated Apr. 6, 2017.
U.S. Appl. No. 14/985,201, filed Dec. 30, 2015, First Office Action Interview, dated Oct. 3, 2017.
U.S. Appl. No. 15/145,177, filed May 3, 2016, Final Office Action, dated Dec. 2, 2016.
U.S. Appl. No. 13/181,392, filed Jul. 27, 2016, Notice of Allowance, dated Jan. 22, 2015.
U.S. Appl. No. 13/838,815, filed Mar. 15, 2013, Notice of Allowance, dated Mar. 3, 2015.
U.S. Appl. No. 14/088,251, filed Nov. 22, 2013, Interview Summary, dated Jun. 30, 2015.
U.S. Appl. No. 14/334,232, filed Jul. 17, 2014, Office Action, dated Jul. 10, 2015.
U.S. Appl. No. 14/196,814, filed Mar. 4, 2014, Office Action, dated May 5, 2015.
U.S. Appl. No. 14/690,905, filed Apr. 20, 2015, Notice of Allowance, dated Nov. 23, 2015.
U.S. Appl. No. 13/839,026, filed Mar. 15, 2013, Notice of Allowance, dated Mar. 11, 2016.
U.S. Appl. No. 14/196,814, filed Mar. 4, 2014, Final Office Action, dated Oct. 7, 2016.
U.S. Appl. No. 14/580,218, filed Dec. 23, 2014, Final Office Action, dated Jan. 7, 2016.
U.S. Appl. No. 13/181,392, filed Jul. 12, 2011, Final Office Action, dated Aug. 26, 2014.
U.S. Appl. No. 14/088,251, filed Nov. 22, 2013, Final Office Action, dated May 20, 2015.
U.S. Appl. No. 12/840,673, filed Jul. 21, 2010, Notice of Allowance, dated Apr. 6, 2015.
U.S. Appl. No. 14/319,161, filed Jun. 30, 2014, Notice of Allowance, dated May 4, 2015.
U.S. Appl. No. 13/728,879, filed Dec. 27, 2012, Office Action, dated Nov. 20, 2015.
U.S. Appl. No. 13/728,879, filed Dec. 27, 2012, Final Office Action, dated Aug. 12, 2015.
U.S. Appl. No. 12/840,673, filed Jul. 21, 2010, Office Action, dated Sep. 17, 2014.
U.S. Appl. No. 13/728,879, filed Dec. 27, 2012, First Action Interview, dated Mar. 17, 2015.
U.S. Appl. No. 14/730,123, filed Jun. 3, 2015, First Office Action Interview, dated Sep. 21, 2015.
U.S. Appl. No. 14/196,814, filed Mar. 4, 2014, First Office Action, dated Aug. 13, 2014.
U.S. Appl. No. 13/838,815, filed Mar. 15, 2013, Notice of Allowance, dated Jan. 29, 2015.
U.S. Appl. No. 14/306,138, filed Jun. 16, 2014, Final Office Action, dated Sep. 14, 2015.
U.S. Appl. No. 14/196,814, filed Mar. 4, 2014, Interview Summary, dated Jul. 28, 2015.
U.S. Appl. No. 14/289,599, filed May 28, 2014, Advisory Action, dated Sep. 4, 2015.
U.S. Appl. No. 14/813,749, filed Jul. 30, 2015, Office Action, dated Sep. 28, 2015.
U.S. Appl. No. 14/326,738, filed Jul. 9, 2014, Final Office Action, dated Jul. 31, 2015.
U.S. Appl. No. 13/839,026, filed Mar. 15, 2013, Restriction Requirement, dated Apr. 2, 2015.
U.S. Appl. No. 14/875,536, filed Oct. 5, 2015, Final Office, dated Action Aug. 7, 2018.
U.S. Appl. No. 14/319,765, filed Jun. 30, 2014, First Office Action Interview, dated Sep. 10, 2015.
U.S. Appl. No. 13/839,026, filed Mar. 15, 2013, Office Action, dated Aug. 4, 2015.
U.S. Appl. No. 14/289,596, filed May 28, 2014, Advisory Action, dated Apr. 30, 2015.
U.S. Appl. No. 14/319,765, filed Jun. 30, 2014, Final Office Action, dated Jun. 16, 2015.
U.S. Appl. No. 13/948,859, filed Jul. 23, 2013, Notice of Allowance, dated Dec. 10, 2014.
U.S. Appl. No. 13/728,879, filed Dec. 27, 2012, First Office Action Interview, dated Jan. 27, 2015.
U.S. Appl. No. 14/225,160, filed Mar. 25, 2014, First Office Action Interview, dated Jul. 29, 2014.
U.S. Appl. No. 14/088,251, filed Nov. 22, 2013, Final Office Action, dated Apr. 18, 2016.
U.S. Appl. No. 12/840,673, filed Jul. 21, 2010, Final Office Action, dated Jan. 2, 2015.
U.S. Appl. No. 13/838,815, filed Mar. 15, 2013, Notice of Allowance, dated Jun. 19, 2015.
U.S. Appl. No. 15/598,752, filed May 18, 2017, Office Action, dated Aug. 29, 2017.
U.S. Appl. No. 14/027,118, filed Sep. 13, 2013, Office Action, dated May 12, 2015.
U.S. Appl. No. 14/319,161, filed Jun. 30, 2014, Final Office Action, dated Jan. 23, 2015.
POI Editor, "How to: Create Your Own Points of Interest," <http://www.poieditor.com/articles/how_to_create_your_own_points_of_interest/> printed Jul. 22, 2012 in 4 pages.
Haralick et al., "Image Analysis Using Mathematical Morphology," Pattern Analysis and Machine Intelligence, IEEE Transactions, Jul. 1987, vol. PAMI-9, No. 4, pp. 532-550.
Gorr et al., "Crime Hot Spot Forecasting: Modeling and Comparative Evaluation", Grant 98-IJ-CX-K005, May 6, 2002, 37 pages.
Gesher, Ari, "Palantir Screenshots in the Wild: Swing Sightings," The Palantir Blog, Sep. 11, 2007, pp. 1-12, retrieved from the internet https://www.palantir.com/2007/09/palantir-screenshots/ retrieved on Aug. 18, 2015.
Official Communication for Netherlands Patent Application No. 2012778 dated Sep. 22, 2015.

(56) References Cited

OTHER PUBLICATIONS

Official Communication for Great Britain Application No. 1404457.2 dated Aug. 14, 2014.
Reddy et al., "Under the hood of GeoVRML 1.0," SRI International, Proceedings of the fifth symposium on Vurtual Reality Modeling Language (Web3D-VRML), New York, NY, Feb. 2000, pp. 23-28. <http://pdf.aminer.org/000/648/038/under_the_hood_of_geovrml.pdf>.
Carver et al., "Real-Time Visibility Analysis and Rapid Viewshed Calculation Using a Voxel-Based Modelling Approach," GISRUK 2012 Conference, Apr. 11-13, Lancaster UK, Apr. 13, 2012, pp. 6.
Official Communication in New Zealand Application No. 627962 dated Aug. 5, 2014.
Official Communication for European Patent Application No. 14187739.9 dated Jul. 6, 2015.
Official Communication in New Zealand Application No. 628840 dated Aug. 28, 2014.
Valentini et al., "Ensembles of Learning Machines", M. Marinaro and R. Tagliaferri (Eds.): WIRN VIETRI 2002, LNCS 2486, pp. 3-20.
VB Forums, "Buffer A Polygon," Internet Citation, <http://www.vbforums.com/showthread.php?198436-Buffer-a-Polygon>, Specifically Thread #1, #5 & #11 retrieved on May 2, 2013, pp. 8.
Pozzi et al., "Vegetation and Population Density in Urban and Suburban Areas in the U.S.A." Third International Symposium of Remote Sensing of Urban Areas Istanbul, Turkey, Jun. 2002, pp. 8.
"HunchLab: Heat Map and Kernel Density Calculation for Crime Analysis," Azavea Journal, printed from www.azavea.com/blogs/newsletter/v4i4/kernel-density-capabilities-added-to-hunchlab/ on Sep. 9, 2014, 2 pages.
Official Communication for New Zealand Patent Application No. 622513 dated Apr. 3, 2014.
Levine, N., "Crime Mapping and the Crimestat Program," Geographical Analysis, 2006, vol. 38, pp. 41-56.
Sonris, "Using the Area of Interest Tools," <http://web.archive.org/web/20061001053327/http://sonris-www.dnr.state.la.us/gis/instruct_files/tutslide12> printed Jan. 3, 2013 in 1 page.
Wikipedia, "Ramer_Douglas_Peucker Algorithm," <http://en.wikipedia.org/wiki/Ramer%E2%80%93Douglas%E2%80%93Peucker_algorithm> printed Jul. 2011, pp. 3.
Chung, Chin-Wan, "Dataplex: An Access to Heterogeneous Distributed Databases", Communications of the ACM, Association for Computing Machinery, Inc., vol. 33, Issue No. 1, pp. 70-80, Jan. 1, 1990.
Notice of Acceptance for Australian Patent Application No. 2012216622 dated Jan. 6, 2015.
Hogue et al., "Thresher: Automating the Unwrapping of Semantic Content from the World Wide Web", 14th International Conference on World Wide Web, WWW 2005: Chiba, Japan, May 10-14, 2005.
Ipbucker, C., "Inverse Transformation for Several Pseudocylindrical Map Projections Using Jacobian Matrix," ICCSA 2009, Part 1 LNCS 5592, pp. 553-564.
Wongsuphasawat et al., "Visual Analytics for Transportation Incident Data Sets," Transportation Research Record 2138, 2009, pp. 135-145.

Rizzardi et al., "Interfacing U.S. Census Map Files with Statistical Graphics Software: Application and Use in Epidemiology," Statistics in Medicine, Oct. 1993, vol. 12, No. 19-20, pp. 1953-1964.
Mandagere, Nagapramod, "Buffer Operations in GIS," <http://www-users.cs.umn.edu/~-npramod/enc_pdf.pdf> retrieved Jan. 28, 2010, pp. 7.
Open Street Map, "Amm's Diary:Unconnected ways and other data quality issues," http://www.openstreetmap.org/user/amm/diary printed Jul. 23, 2012 in 3 pages.
Notice of Acceptance for Australian Patent Application No. 2014201599 dated Aug. 31, 2017.
Woodbridge, Stephen, "[geos-devel] Polygon simplification," <http://lists.osgeo.org/pipermail/geos-devel/2011-May/005210.html> dated May 8, 2011, pp. 3.
Vivid Solutions, "JTS Topology Suite: Technical Specifications," <http://www.vividsolutions.com/jts/bin/JTS%20Technical%20Specs.pdf> Version 1.4, 2003, pp. 36.
Ghosh, P., "A Solution of Polygon Containment, Spatial Planning, and Other Related Problems Using Minkowski Operations," Computer Vision, Graphics, and Image Processing, 1990, vol. 49, pp. 1-35.
Murray, C., Oracle Spatial Developer's Guide—6 Coordinate Systems (Spatial Reference Systems), <http://docs.oracle.com/cd/B28359_01/appdev.111/b28400.pdf>, Jun. 2009.
Map Builder, "Rapid Mashup Development Tool for Google and Yahoo Maps!" <http://web.archive.org/web/20090626224734/http://www.mapbuilder.net/> printed Jul. 20, 2012 in 2 pages.
Tangelder et al., "Freeform Shape Matching Using Minkowski Operations," The Netherlands, Jun. 1996, pp. 12.
Official Communication for Great Britain Patent Application No. 1411984.6 dated Dec. 22, 2014.
Official Communication for Australian Patent Application No. 2014210604 dated Jun. 5, 2015.
Reibel et al., "Areal Interpolation of Population Counts Using Pre-classied Land Cover Data," Population Research and Policy Review, 2007, vol. 26, pp. 619-633.
"Andy Turner's GISRUK 2012 Notes" <https://docs.google.com/document/d/1cTmxg7mVx5gd89lqblCYvCEnHA4QAivH4I4WpyPsqE4/edit?pli=1> printed Sep. 16, 2013 in 15 pages.
Official Communication for European Patent Application No. 14197879.1 dated Apr. 28, 2015.
Snyder, "Map Projections—A Working Manual," U.S. Geological Survey Professional paper 1395, United States Government Printing Office, Washington: 1987, pp. 11-21 and 60-70.
Qiu, Fang, "3d Analysis and Surface Modeling", <http://web.archive.org/web/20091202221925/http://www.utsa.edu/lrsg/Teaching/EES6513/08-3D.pdf> printed Sep. 16, 2013 in 26 pages.
Official Communication for European Patent Application No. 14159464.8 dated Aug. 20, 2014.
Reibel, M., "Geographic Information Systems and Spatial Data Processing in Demography: a Review," Population Research and Policy Review, 2007, vol. 26, pp. 601-618.
Barnes et al., "Viewshed Analysis", GIS-ARC/Info 2001, <www.evsc.virginia.edu/~jhp7e/evsc466/student_pres/Rounds.pdf>.
Wikipedia, "Douglas_Peucker-Algorithms," <http://de.wikipedia.org/w/index.php?title=Douglas-Peucker-Algorithmus&oldid=91846042> printed Jul. 2011, pp. 2.

* cited by examiner

MOBILE TASKS

BENEFIT CLAIM

This application claims the benefit under 35 U.S.C. § 120 as a continuation of application Ser. No. 14/196,814, filed Mar. 4, 2014, the entire contents of which are hereby incorporated by reference as if fully set forth herein. The applicant(s) hereby rescind any disclaimer of claim scope in the parent application(s) or the prosecution history thereof and advise the USPTO that the claims in this application may be broader than any claim in the parent application(s).

TECHNICAL FIELD

The present disclosure generally relates to data analysis.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

Data analysis is a process of inspecting, cleaning, transforming, and/or modeling data for objectives such as discovering useful information, suggesting conclusions, and/or supporting decision making. Various data analysis techniques involve repositories of data structures, such as data objects, stored on computer-readable media. An object is typically comprised of named substructures, which are often referred to as fields or properties. In many repositories, objects may be interrelated based on their properties and/or relationship data external to the objects. Two related objects are said to be associated, related, or linked.

Many repositories conform to one or more data models, ontologies, schemas, or other architectural frameworks, that place constraints on how objects are organized. For example, in many repositories, objects conform to one of a plurality of defined object types. Among other aspects, the type of an object specifies which types of substructures are found in the object. These substructures, referred to herein as properties, are typically assigned property names.

Some computer-based tools for analyzing data allow an analyst to visualize data objects in a variety of manners, or allow the analyst to mine, investigate, and/or take actions based upon the data objects. For instance, some types of data analysis tools allow an analyst to build graphs, charts, and/or reports based on various data objects. Another type of data analysis tool represents objects as linked nodes within a graph. Another type of data analysis tool involves workflows comprising a series of action nodes that input one set of data objects and output another set of data objects.

In the course of analyzing data, a computer, analyst, or other entity may determine that one or more actions need to be performed. For example, an analyst may determine that certain data objects are of interest for varying reasons, and that one or more actions need to be performed to investigate and/or address those data objects.

For instance, many organizations utilize data analysis processes to conduct operations that include organization members performing activities in a dispersed geographic area. The operations of a law enforcement agency typically include police officers patrolling assigned geographic areas, responding to crime scenes, and interviewing suspects and witnesses. Or, a disaster relief organization may respond to a natural disaster by sending out aid workers to a disaster area to locate and provide assistance to those in crisis. These types of operations may be referred to as field operations and may generally include monitoring specific geographic areas and subjects, interacting with persons of interest, responding to and reporting information about the occurrence of notable events, and any other activities that an organization member may perform in the field. In order to better coordinate field operations, an organization may employ one or more other organization members at a centralized location, referred to herein as operations analysts, that help coordinate the activities of the organization members in the field, referred to herein as field analysts. For example, operations analysts may be responsible for instructing field analysts on various actions or operations that need to be performed in view of a data analysis. Such actions or operations might include, for example, locations to investigate or subjects to monitor. Similarly, field analysts may be expected to communicate certain information related to the field operations back to operations analysts.

SUMMARY OF THE INVENTION

The appended claims may serve to summarize the invention.

DETAILED DESCRIPTION

Figure 1:
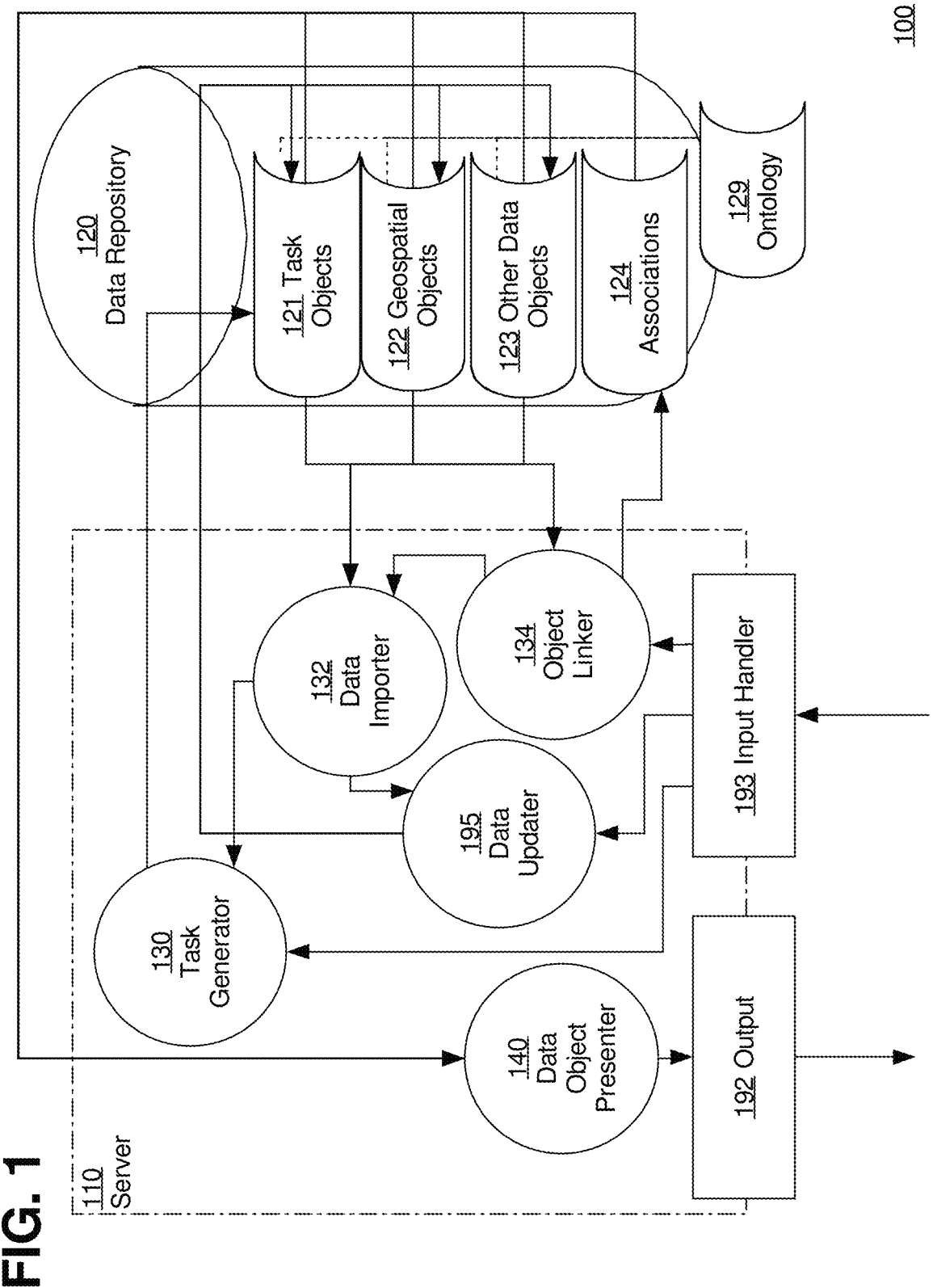
FIG. 1 illustrates an example system in which the techniques described herein may be practiced.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

1.0. General Overview

According to various embodiments, activities related to data analyses are managed in part using task objects representing tasks that need to be performed. According to an embodiment, a system comprises: a data repository configured to store data objects; a task object generation component, configured to generate task objects and cause the task objects to be stored in the data repository; an object linking component, configured to attach particular data objects stored in the data repository to particular task objects generated by the task object generation component; a data importing component, configured to identify a first field of a first task object, of the task objects, that corresponds to a second field of a first data object, of the data objects, the first data object having been attached to the first task object, the second field storing a particular value; wherein the data importing component is further configured to assign the first field of the first task object to the particular value of the second field of the first data object.

In an embodiment, the system further comprises a data updating component configured to receive location input that identifies geographic locations to associate with the task objects, and to store information describing the geographic locations in association with the task objects. The system further comprises a data presentation component configured to display task icons representing the task objects on a map based on the stored geographic locations.

In an embodiment, the first field and the second field are both one of: a location attribute, object title, object description, or assigned user or user group. In an embodiment, the task objects conform to a task object data structure type, the task object data structure type defining task object fields of the task objects, including the first field. The data objects conform to particular data object structure types that define particular fields of the data objects, the particular data object structure types being different from the task object data structure type. The data importing component is configured to determine that the second field corresponds to the first field by comparing first definition data for the task object data structure type to second definition data for a first data object structure type to which the first data object conforms.

In an embodiment, the system further comprises a data updating component configured to receive input indicating that tasks corresponding to particular task objects have been completed. The data updating component is configured to, responsive to input indicating that a first task corresponding to the first task object has been completed, and based on the first task object being attached to the first data object, automatically change a status field of the first data object.

In an embodiment, the system further comprises: a data presentation component configured to display, on a map, a plurality of task icons representing a plurality of the task objects that have not been assigned to user objects, of the data objects, and further configured to display a plurality of user icons representing a plurality of the user objects; and an input handler configured to receive assignment inputs that drag particular user icons over particular task icons; wherein the object linking component is configured to attach particular user objects, corresponding to the particular user icons, to particular task objects, corresponding to the particular task icons, responsive to the assignment inputs received by the input handler.

In an embodiment, the system further comprises: a data presentation component configured to display indications of distances between first locations associated with a plurality of the task objects and a second location associated with a particular user object, of the data objects; wherein the object linking component is configured to, responsive to input selecting a second task object from the plurality of the task objects, store an association between the second task object and the particular user object.

In an embodiment, the system further comprises: a data updating component configured to determine that the first data object has been updated to store information describing a new geographic location; and a data presentation component configured to, responsive to the determining that the first data object has been updated, move a first icon that represents the first task object to a new position on a map, the new position reflecting the new geographic location.

According to an embodiment, a method comprises: receiving a first request to generate a task object that describes a task; responsive to the first request, generating the task object, the task object being a data structure that comprises values for task object fields that represent attributes of the task; identifying, in a repository of data objects, a particular data object to associate with the task object; determining that a first field of the task object fields corresponds to a second field of the particular data object, the second field of the particular data object having a particular value; and assigning the first field of the task object to the particular value of the corresponding second field.

In an embodiment, the first field and the second field both represent a location attribute, wherein the particular value is location information. In an embodiment, the particular data object is one of: a report data structure, or an event data structure. In an embodiment, the first field and the second field are both an object title. In an embodiment, the first field and the second field are an assigned user or user group. In an embodiment, the first request specifies an identifier for the particular data object.

In an embodiment, the task object conforms to a task object data structure type, the task object data structure type defining the task object fields. In an embodiment, the particular data object conforms to a particular data object structure type that defines particular fields of the particular data object, the particular data object structure type being different from the task object data structure type; and determining that the second field corresponds to the first field comprises comparing first definition data for the task object data structure type to second definition data for the particular data object structure type. In an embodiment, determining that the second field corresponds to the first field comprises determining that the second field has a same name as the first field. In an embodiment, determining that the second field corresponds to the first field comprises determining that the second field and the first field descend from a common structural element of a common object type definition. In an embodiment, determining that the first field corresponds to the second field comprises: determining that the particular data object is of a particular data object structure type; locating, in a plurality of data structure type mappings, a mapping between the particular data object structure type and a task object data structure type; and determining that the first field corresponds to the second field based on the mapping.

In an embodiment, the method further comprises assigning the first field of the task object to the particular value while generating the task object. In an embodiment, the method further comprises: receiving a second request to attach the particular data object to the task object, and generating a link between the task object and the particular data object, wherein assigning the first field of the task object to the particular value of the corresponding second field occurs responsive to the second request. In an embodiment, assigning the first field of the task object to the particular value comprises storing the particular value in the first field of the task object. In an embodiment, assigning the first field of the task object to the particular value comprises storing a link between the first field of the task object and the second field of the particular data object. In an embodiment, assigning the first field of the task object to the particular value comprises, responsive to a second request to return the value of the first field of the task object: locating the particular data object based on a link between the task object and the particular data object, and returning the particular value in response to the second request based on the determining that the second field corresponds to the first field. In an embodiment, assigning the first field of the task object to the particular value of the corresponding second field occurs only responsive to determining that the first field of the task object is empty.

In an embodiment, the method further comprises assigning multiple values for multiple fields of the task object fields based on values stored in the particular data object. In an embodiment, the method further comprises identifying, in a repository of data objects, a second particular data object to associate with the task object; determining that a third field of the task object fields corresponds to a fourth field of the second particular data object, the fourth field of the second particular data object having a second particular value; and assigning the third field of the task object to the second particular value of the corresponding fourth field.

In an embodiment, the method further comprises one or more of: changing the particular value in the first field responsive to a change in the particular value for the second field; and/or changing the particular value in the second field responsive to a change in the particular value for the first field. In an embodiment, the method further comprises receiving input indicating that the task corresponding to the task object is complete; and responsive to the input, based on the association between the task object and the particular data object, automatically changing a status field of the particular data object.

In an embodiment, the method further comprises: receiving input that identifies a geographic location to associate with the task object; and determining to associate the particular data object with the task object based on comparing the geographic location to one or more location fields in the particular data object. In an embodiment, the method further comprises displaying a first icon representing the task object; displaying a second icon representing the particular data object; receiving input that drags the second icon over the first icon; wherein identifying the particular data object to associate with the task object occurs responsive to the input.

According to an embodiment, a method comprises: receiving a request to generate a task object that describes a task; generating the task object responsive to the request; receiving first input that identifies a geographic location to associate with the task object; storing information describing the geographic location in association with the task object; and displaying a first icon representing the task object on a map, based on the stored geographic location.

In an embodiment, the request specifies the geographic location. In an embodiment, the first input indicates a particular data object to attach to the task object, wherein the geographic location is stored in the particular data object. In an embodiment, the first input indicates that a user has dragged the first icon to the geographic location on the map. In an embodiment, the method further comprises: displaying a second icon representing a particular data object at the geographic location on the map, the particular data object storing the information describing the geographic location; receiving second input that selects a graphical interface control associated with the second icon; wherein the request is responsive to the second input, wherein the request thereby includes the first input that identifies the geographic location.

In an embodiment, the method further comprises changing the first icon based on a task status field of the task object. In an embodiment, the geographic location is a first geographic location, and the method further comprises: determining that the task object has been updated to store a second geographic location that is not the first geographic location; and moving the first icon on the map to reflect the second geographic location. In an embodiment, the method further comprises: storing an association between the task object and a particular data object other than the task object, the particular data object storing the information describing the geographic location; determining that the particular data object has been updated to store information describing a new geographic location; and moving the first icon to a new position on the map, the new position reflecting the new geographic location.

In an embodiment, the method further comprises: displaying, on the map, a plurality of task icons representing a plurality of task objects that have not been assigned to user objects, the plurality of task icons including the first icon; displaying a plurality of user icons representing the user objects; receiving input that drags a particular user icon over the first icon; and storing an association between the task object and a particular user object represented by the particular user icon, the association indicating that the task object is assigned to the particular user object. In an embodiment, the method further comprises: displaying, on the map, a plurality of task icons representing a plurality of task objects that have not been assigned to user objects, the plurality of task icons including the first icon; displaying indications of distances between first locations associated with the plurality of task objects and a second location associated with a particular user object; responsive to input selecting the first icon, storing an association between the task object and the particular user object, the association indicating that the task object is assigned to the particular user object.

Other embodiments include, without limitation, a non-transitory computer-readable medium that includes processor-executable instructions that enable a processing unit to implement one or more aspects of the disclosed methods as well as a system configured to implement one or more aspects of the disclosed methods.

2.0. Structural Overview

FIG. 1 illustrates an example computer system 100 in which the techniques described herein may be practiced, according to an embodiment. The various components of system 100 are implemented at least partially by hardware at one or more computing devices, such as one or more hardware processors executing instructions, stored in one or more computer-readable memories, for performing various functions described herein. System 100 is configured to store and manipulate data structures in one or more data repositories 120. System 100 further comprises one or more output components 192 configured to cause output devices, such as computer monitors or printers, to display information derived from the data structures. System 100 further comprises one or more input handlers 193 configured to receive inputs that request to manipulate the data structures stored in the one or more data repositories 120 and/or the information displayed by the output devices.

In an embodiment, system 100 is a server computer system, comprising one or more server computer devices that collectively implement the various components of system 100 as a set of server-side processes. The server computer system may include web server, application server, database server, and/or other conventional server components that the depicted components utilize to provide the described functionality. The output component(s) 192 send instructions that cause various client computing devices, such as desktop computers or mobile computing devices, to display various presentations of data as described herein. For instance, the server computer system may output web pages and/or script-based instructions over any combination of network components to web browsers or other software applications at the client computing devices. Similarly, input handler(s) 193 receive inputs, such as hyper-text transfer protocol (HTTP) requests or application programming interface (API) calls, from the client computing devices.

In an embodiment, system 100 is a "thick client" server-client system, in which certain components are implemented at a server computer system as described above, while other components are implemented at client computing devices such as described above. The exact division of components between the server computer system and the client computing devices will vary depending on factors such as network speed and bandwidth and client computing resources. In such a system 100, output component(s) 192 communicate directly with display devices at the client computing devices via, for instance, graphics APIs and/or command-line interfaces. Similarly, input handler(s) 193 receive inputs directly from input devices such as touchscreens or keyboards. In yet other embodiments, system 100 is a single computing device.

2.1. Data Repositories

System 100 comprises one or more repositories of data 120. The one or more repositories of data 120 comprise computer-readable media that persistently store data for a variety of data structures, including structures referred to herein as objects. A data object is a data structure that comprising values for various defined fields. These fields, also referred to as attributes or properties, reflect various aspects of information modeled by a corresponding object type. Examples of fields include, without limitation, titles, names, descriptions, dates, identifiers, categorical data, and so forth.

In an embodiment, a data object is a structure stored directly on a computer-readable media. In other embodiments, a data object is a logical data structure described by various underlying structures stored on the computer-readable media. For instance, the values for a data object may be stored in a variety of underlying structure(s), such as a file, portions of one or more files, one or more XML elements, a database table row, a group of related database table rows, and so forth. An application will read the underlying structure(s), and interpret the underlying structure(s) as the data object. The data object is then processed using various steps and algorithms such as described herein.

In an embodiment, regardless of how the underlying data for an object is stored, a data server layer represents that underlying data to some or all of the other components of system 100 using object-oriented data representation techniques, in accordance with one or more ontologies 129. In yet other embodiments, no object-oriented data representations techniques are necessary, and the components of system 100 utilize objects directly within their respective underlying data structure forms.

The one or more repositories 120 more specifically store at least task objects 121, geospatial objects 122, other data objects 123, and associations 124. System 100 further comprises one or more ontologies 129. An ontology 129 is a collection of definition data that describes various object types. Objects 121, 122, 123, 124 correspond to different discrete object types defined by the one or more ontologies 129. In one aspect, the one or more ontologies 129 define which fields are utilized for each object type. There may be multiple types of task objects 121, geospatial objects 122, other objects 123, and associations 124, each of which may have their own individual object type definition in the one or more ontologies 129.

Each task object 121 is a data structure that represents one or more tasks, which in turn correspond to a series of one or more actions that need to be performed. Data stored within the task objects describe various aspects of the represented tasks, and may be presented using maps, graphs, and/or any other suitable presentation techniques. Based on the task objects, interfaces may be provided that allow users to identify tasks that need to be performed, identify locations at which the tasks need to performed, identify existing data objects within a data repository that are related to the tasks, track the progress of the tasks and/or various subelements of the tasks, report completion of the tasks to other users, and/or perform a variety of other actions related to the represented tasks.

Geospatial objects 122 include a variety of object types that include or are otherwise associated with location data describing one or more geographic locations. Each geographic location may reflect, for instance, a location at which a task is to be at least partially performed, a location of a report or other data object in response to which the task object was created, and/or a location of a user object assigned to the task object. The degree of specificity of the geographic location may vary depending on the task object and/or the embodiment. For instance, a geographic location may be a coordinate within a coordinate system, such as a combination of a latitude, longitude, and/or elevation in a geographic coordinate system. The geographic location may instead be a physical address, including a street name and building number, or the names of intersecting streets. The geographic location may instead be specified using a named place or region. For instance, the geographic location may be specified as any combination of one or more of: a business name, pre-defined point of interest, city, zip code, state, country, and so forth. In an embodiment, the geographic location may be an arbitrary region having boundaries specified with respect to any of the above, such as a radius from a specified coordinate, a block bounded by a group of streets, or a polygon with specified coordinates as vertices. In an embodiment, a task object may store and/or be associated with information specifying a geographic location, and thus also be considered a geospatial object 122.

Other data objects 123 are not necessarily associated with location data. Both geospatial objects 122 and other data objects 123 may include a variety of types of objects. Example object types include event objects comprising data describing events that have occurred, report objects comprising data describing reports generated by users such as operators or field analysts, user objects comprising data describing individual persons, resource objects or asset objects comprising data describing physical assets or resources that are available, and so forth. In an embodiment, there may further be subcategories of the above object types, for describing certain kinds of users, assets, resources, events, or reports that have a particular role or characteristic that is uncommon to other users, assets, resources, events, or reports. In an embodiment, any of the above objects may be assigned to group objects, so as to create, for instance, a team of users, or an inventory of resources that belong to a particular user or department.

Associations 124 are data structures that describe relationships between object 121-123. An association 124 may be a discrete data structure, or an association may be a logical construct derived from correlating objects 121-123 based on identifiers found in objects 121-123. For instance, one type of association is an attachment. A task object may, for instance, include a number of attachment fields specifying identifiers of other data objects 121-123 that have been attached to the task object. Or, a separate association table may include records that specify a task object identifier for a task object, and another object identifier that corresponds to an object that has been attached to the task object. Associations 124 may describe many other types of relationships to a given task object, such as an assigned user object, an allocated resource object, an originating report or event object, a follow-up task object, and so forth.

For simplification, this disclosure may at times refer to an object 121-123 or other data structure within the one or more data repositories 120 by referring to the task, report, user, or other item that the data structure represents. Furthermore, examples of systems comprising suitable data repositories 120 are given in the documents incorporated by reference in other sections of this application.

2.2. Task Object Generator

System 100 comprises a task object generation component 130. Task object generation component 130 receives requests to generate task objects 121, and generates task objects 121 responsive to those requests. In response to certain requests, task object generation component 130 may initially generate "empty" task objects that comprise trivial or null values for each task object field. In response to other requests, task object generation component 130 may populate various fields of newly generated task objects 121 with values derived from parameters included with the request or supplied by a data importing component 132.

Task object generation component 130 may provide one or more interfaces for receiving requests to generate tasks, such as application programming interfaces (APIs) for receiving requests from other components of system 100, including input handler 193. In an embodiment, task object generation component 130 may further provide to output component 192 various graphical user interface (GUI) elements for creating new task objects. These elements may include controls such as buttons, hot spots, icons, and so forth that guide a user in submitting, to input handlers 193, inputs that will be interpreted as requests to generate new task objects 121. Example requests and interface elements for creating new task objects 121 are described in other sections.

2.3. Data Presentation Component

System 100 further comprises one or more data object presentation components 140. Each data presentation component 140 generates presentations of information based on data objects 121-124, such as graphs, maps, charts, workflows, tables, reports, and so forth. The presentations are suited for a variety of analyses, including geospatial analyses, relational analyses, and temporal analyses. System 100 may further comprise map data that defines various aspects of maps that data presentation component 140 may generate, such as address or coordinate information, points of interests, background map images, and so forth. Examples of systems comprising suitable data presentation components 140 are given in the documents incorporated by reference in other sections of this application.

The presentations produced by data presentation component 140 are embedded in graphical user interfaces for viewing and/or manipulating presentations. These graphical user interfaces are then provided to an output component 192. The graphical interface may comprise, in additional to the presentations, a variety of user interface controls for submitting inputs to input handler 193. Input handler(s) 193 interpret the inputs as various commands to the components of system 100. For instance, an input handler 193 may interpret some inputs as commands for manipulating the presentations provided by data presentation component 140, and thus send the commands to data presentation component 140. Responsive to the commands, data presentation component 140 reduces, expands, simplifies, filters, or otherwise manipulates the depicted presentations of objects and relationships, in accordance with any suitable technique. Other examples of user interface controls may include, without limitations, controls for selecting which presentation(s) and/or data objects 121-124 the data presentation component 140 should display, controls for scrolling, zoom controls, and so forth.

2.4. Data Updater

System 100 further comprises one or more data updating components 195. Input handler(s) 193 may interpret other inputs as commands for manipulating data objects 121-124, and thus send the commands to a data updating component 195. The data updating component 195 then updates, or instructs a data server component to update, data within the one or more data repositories 120 in accordance to the commands.

In an embodiment, a data updating component 195 may further be configured to monitor various data objects 121-124 in accordance with constructs referred to herein as triggers. A trigger is a set of one or more instructions that are associated with specific objects 121-124, or fields thereof. When data updating component 195 changes a value in one of the associated objects 121-124 or fields, or when data updating component 195 detects that a value has changed, data updating component 195 executes the instructions in the trigger. One example of an instruction that may be found in a trigger is an instruction to change another object 121-124, or field thereof, based on the changed value. For instance, a trigger may facilitate changing a task object 121 in response to a change in an object 123 that is associated with the task object 121, or vice versa.

A data updating component 195 may provide one or more interfaces for receiving requests to update data, such as application programming interfaces (APIs) for receiving requests from other components of system 100, including input handler 193. In an embodiment, data updating component 195 may further provide to output component 192 various GUI elements for editing data objects 121-124. These elements may include controls such as text entry boxes, buttons, hot spots, icons, and so forth that guide a user in submitting, to input handlers 193, inputs that will be interpreted as requests to update objects 121-124. Examples of systems comprising suitable data updating components 195 are given in the documents incorporated by reference in other sections of this application

2.5. Object Linker

System 100 further comprises one or more object linking components 134. An object linking component 134 receives requests to associate two or more of objects 121-123. Based on the requests, object linking component 134 establishes associations 124. For instance, object linking component 134 may receive a request to attach a specified object 122 or 123 to a task object 121. Object linking component 134 may therefore generate an association 124 between the specified object 122 or 123 and the task object 121. Optionally, object linking component 134 may further generate metadata describing the association 124, such as an association type, date, and so forth.

In an embodiment, object linking component 134 further receives requests from other components of system 100, such as data importing component 132 or data presentation component 140, to locate objects 121-123 that are associated with a specified one of objects 121-123. Object linking component 134 locates the associated objects 121-123 based on the associations 124, and returns information identifying the associated object 121-123. In an embodiment, the requests may identify a specific type of association 124 based upon which to locate the associated objects 121-123, and object linking component 134 may limit the response to associated objects 121-123 having the specified type of association 124.

An object linking component 134 may provide one or more interfaces for receiving requests to establish associations 124 and/or retrieve associated objects 121-123, such as application programming interfaces (APIs) for receiving requests from other components of system 100, including input handler 193. In an embodiment, data updating component 195 may further provide to output component 192 various GUI elements for establishing associations 124 and/or viewing associated objects 121-123. These elements may include controls such as text entry boxes, buttons, hot spots, icons, and so forth that guide a user in submitting, to input handlers 193, inputs that will be interpreted as requests to establish associations 124 and/or generate presentations of associated objects 121-123. Examples of such interfaces are given in other sections of this application, as well as in the documents incorporated by reference in other sections of this application

2.6. Data Importer

System 100 further comprises a data importing component 132. Among other aspects, data importing component 132 receives requests to assign data from an object 122 or 123 to a task object 121. Requests may be received, for instance, in response to object linking component 134 establishing an association 124 between the object 122/123 and the task object 121. Requests may also or instead be received from an input handler 193 via interface controls configured to solicit inputs that request performance of an import operation.

Data importing component 132 is configured to identify fields of a task object 121 that correspond to fields of an associated object 122/123. The identification process may involve, for instance, identifying similar fields based on various metadata associated with the fields, such as names, descriptions, inherited features, and so forth. For instance, the identification process may involve consulting object type definitions in an ontology 129. The identification process may also or instead involve consulting pre-defined mapping data that indicates which fields of a particular object type correspond to which task object fields. In an embodiment, data importing component 132 may employ any other suitable technique for identifying fields that correspond between an object 122/123 and task object 121.

In an embodiment, data importing component 132 is configured to copy values from fields of objects 122/123 to corresponding fields of task object 121. In an embodiment, data importing component 132 is further configured to establish triggers that will cause data updating component 195 to synchronize subsequent changes from one field of object 122/123 or task object 121 to a corresponding field of object 122/123 or task object 121, so as to ensure that the two fields remain synchronized between the object 122/123 and the task object 121. However, in other embodiments, keeping the fields synchronized may not be desirable.

In an embodiment, data importing component 132 may further be called to assign data to a field of task object 121 dynamically, based on a previously established association 124. Thus, rather than copying a value from a field of an object 122/123 to a corresponding field of a task object 121, a link is established between the field of the task object 121 and the corresponding field of the object 122/123. When any component of system 100 needs the value of the field of task object 121, data importing component 132 may be called to retrieve the value from the linked field of object 122/123.

2.7. Variations

System 100 illustrates only one of many possible arrangements of components configured to provide the functionality described herein. Other arrangements may include fewer, additional, or different components, and the division of work between the components may vary depending on the arrangement. For example, in other embodiments, there need not be geospatial objects 122 and/or other objects 123. In yet other embodiments, no object linking component 134, associations 124, and/or data importing component 132 are needed. In yet other embodiments, associations 124 are established and maintained directly by other components of system 100, and no discrete object linking component 134 is needed.

In FIG. 1, the various components of system 100 are depicted as being communicatively coupled to various other components by arrows. These arrows illustrate only certain examples of information flows between the components of system 100. Neither the direction of the arrows nor the lack of arrow lines between certain components should be interpreted as indicating the absence of communication between the certain components. Indeed, each component of system 100 may feature an open port, API, or other suitable communication interface by which the component may become communicatively coupled to other components of system 100 as needed to accomplish any of the functions of system 100 described herein.

3.0. Functional Overview

Techniques are described herein for generating and utilizing task data objects. The techniques described herein are performed by a system of one or more computing devices, such as system 100 depicted in FIG. 1. In an embodiment, each of the processes described in connection with the functional blocks described below may be implemented using one or more computer programs, other software elements, and/or digital logic in any of a general-purpose computer or a special-purpose computer, while performing data retrieval, transformation, and storage operations that involve interacting with and transforming the physical state of memory of the computer.

3.1. Location-Sensitive Tasks

Figure 2:
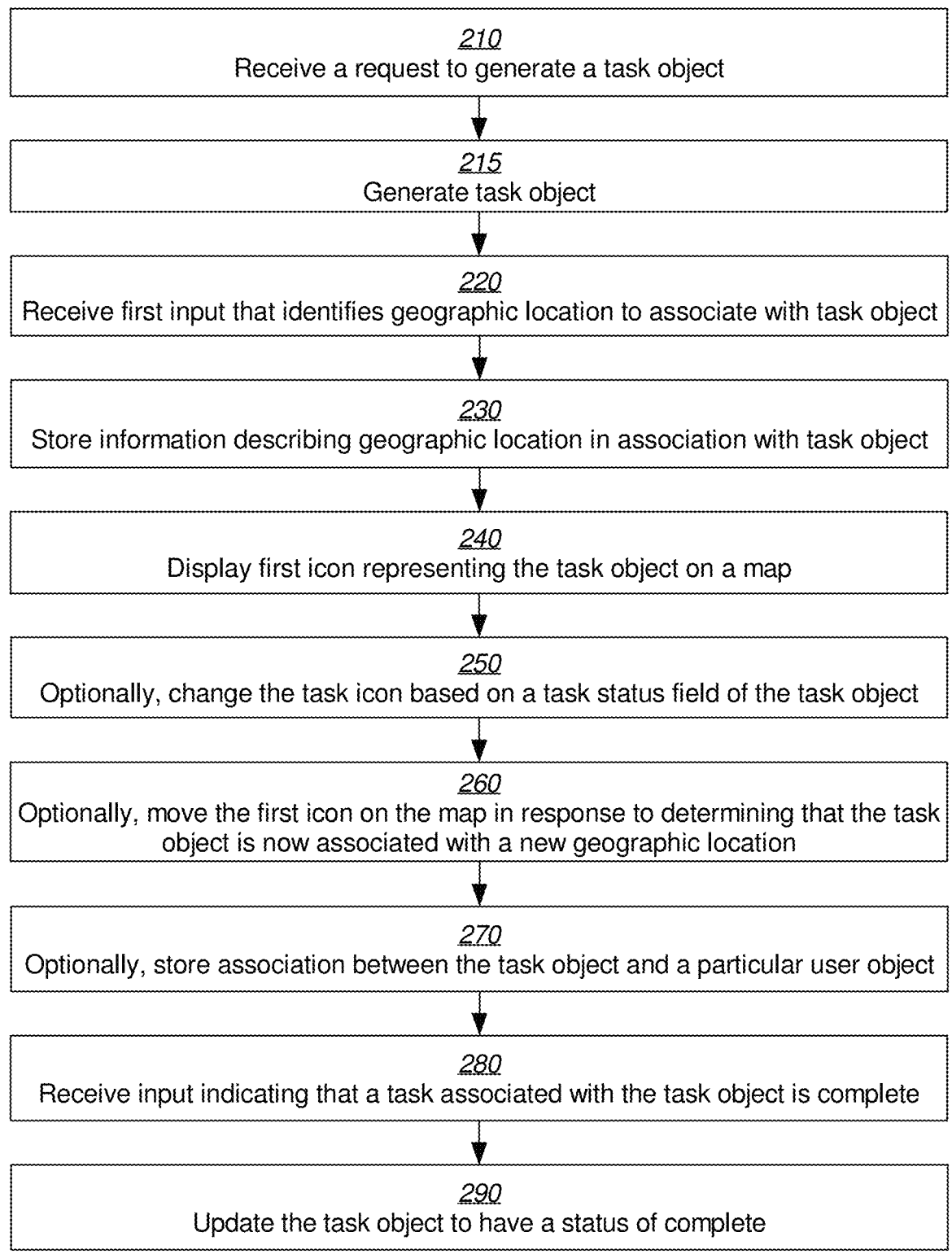
FIG. 2 illustrates an example flow for generating and utilizing a location-sensitive task object.

According to an embodiment, a user who has identified actions to perform based on data objects such as described herein may utilize the systems and/or techniques described herein to create task objects that are associated with location data. FIG. 2 illustrates an example flow 200 for generating and utilizing a location-sensitive task object, according to an embodiment.

Block 210 comprises receiving a request to generate a task object that describes a task. For example, an analyst or other user may access a graphical user interface that allows the user to create and view tasks. The graphical user interface may feature one or more controls that, when selected by user input, cause the request to be sent to a task object generation component, such as described elsewhere in this disclosure. The user may decide that a task object should be created, for instance, in response to viewing information from reports, events, or other data objects that indicate to the user that a task needs to be performed. The request may optionally include parameters that specify certain aspects of the task, such as a title, description, due date, and so forth.

As another example, the request may be triggered programmatically in response to an automated process that analyzes various data objects and determines whether a certain condition has been met. For instance, various task triggers may be defined. Task triggers may be conditioned upon the lapsing of a certain time period, so that new tasks are generated automatically on a daily, weekly, or some other scheduled basis. Task triggers may also or instead be conditioned upon finding that one or more fields or one or more data objects have value(s) that meet certain specified criteria. When a particular set of one or more data objects meet the conditions of a task trigger, the task trigger sends a request to a task object generation component to create a task object. Various fields of the task objects may be assigned values that are based on those found in the triggering data object(s). For instance, a task trigger may monitor data objects of a certain type for a certain status field value, such as "missing." When the certain status field value is found in a data object, a task may be created with a title such as "Find missing object" and a name that corresponds to the name of the data object.

Block 215 comprises generating the task object responsive to the request. A task object that conforms to a task object data structure type is generated. The task object comprises values for task object fields defined by the task object data structure type, such as a title, description, date due, and so forth. Depending on the embodiment, the values may be initially empty, or set to certain default values. In an embodiment, if parameters indicating values of the task object fields were included in the request of block 210, the parameters are stored within corresponding task object fields.

Block 220 comprises receiving first input that identifies a geographic location to associate with the task object. In an embodiment, the request of block 210 includes the first input of block 220. For instance, the geographic location may be included as a parameter when requesting to creating the task object, or may be derived based on other information included in or associated with the request. In other embodiments, the geographic location may be added subsequent to the request of block 210 via a task object property editing interface, a programmatic interface, or any other suitable data manipulation mechanism.

In an embodiment, the first input indicates a particular data object to attach to the task object. The geographic location is stored in one or more fields of the particular data object, and is thus derived from the particular data object. For instance, a user may request to create a task object that is attached to a certain report object or event object that already has an associated geographic location. The task object is automatically associated with this same geographic location. Optionally, data from the particular data object may be linked to or imported into the task object, as described in other sections.

In an embodiment, the first input indicates that a user has dragged a task icon to the geographic location on a map. For instance, responsive to the request of block 210, a graphical user interface may display a task icon that represents the newly generated task object in a workspace, graph, tree, list, or any other suitable display area. The graphical user interface may include a map display area. A user may provide the first input by clicking, tapping, or otherwise selecting the task icon, and then dragging the task icon to the map display area. The user may then "drop" the task icon at a position in the map display area that corresponds to the desired geographic location. In a similar embodiment, a task creation icon representing a process for creating a new task object may be displayed prior to block 210. The user may drag the task creation icon to a position on the map display area to request that a new task object be created and associated with the geographic location that corresponds to the position.

In yet another embodiment, the graphical user interface may display an object icon that represents a particular data object, such as a report object, event object, or user object, on the map. The particular data object stores information describing a geographic location, and is thus displayed at that geographic location. A user may drag and drop a task icon or task creation icon on the object icon. Or, the user may select a graphical interface control associated with the second icon, such as by right-clicking on the object icon, or tapping on a button control while the object icon is in focus. Responsive this input, the graphical user interface may create, or show a menu for creating, the task object at the same geographic location as the particular data object. In an embodiment, the particular data object may furthermore be attached to the task object, and/or data from the particular data object may be linked to or imported into the task object, as described in other sections.

Block 230 comprises storing information describing the geographic location in association with the task object. For instance, the task object may include one or more geographic location fields in which information specifying the geographic location is stored. As another example, a link between the task object and another object, such as the above described particular data object, may be stored. Information describing the geographic location may be stored, or may already be stored, within the other object. The geographic location is thus associated with the task object via the link. In an embodiment, the geographic location need not be stored in the exact same manner as provided via the input of block 220, but rather may be converted or resolved to a different form prior to storage. For instance, if the input of block 220 specified a predefined point of interest, block 230 may comprise resolving the point of interest to a geographic coordinate or address. Similarly, if the input of block 220 specified a geographic coordinate, the geographic coordinate may in some embodiments be resolved to an address prior to storage.

Block 240 comprises displaying a first icon representing the task object on a map based on the stored geographic location. For instance, at some time subsequent to block 230, a user may request to view the task object. In an embodiment, the user may specifically request to view the task object stored in block 230. For instance, the user may search for the task object or see the task object in a list of task objects. The user may then request to see the task object on a map. An icon representing the task object is generated and displayed at a position corresponding to the geographic location stored in block 230. In an embodiment, the map may further include icons representing other data objects as well, such as user icons representing locations of user objects, asset icons representing locations of asset objects, report icons representing locations of report objects, and so forth.

In an embodiment, the user may request to view a group of task objects that happen to include the task object stored in block 230. A user may request to view a variety of groups of task objects, including without limitation a group of all task objects stored within a data repository, a group of task objects due by a certain date, a group of task objects within a certain proximity to a location, a group of unassigned task objects, a group of incomplete task objects, or a group of task objects whose members are selected by filtering upon any other criteria that is based upon data stored within or otherwise associated with a repository of task objects. Some or all of the task objects within the group may then be presented as icons at their corresponding geographic locations within a map. The graphical user interface may further include controls that allow users to perform a variety of actions with respect to the task objects depicted on the map, such as zooming into specific areas to better see the locations of certain task objects, filtering the group of task objects, viewing a list of task objects, sorting the list of task objects by distance from a location or other criteria, selecting a specific task object, or viewing and/or editing fields of a selected task object.

Optional block 250 comprises changing the task icon based on a task status field of the task object. For instance, the task object may store a task status field whose value may be selected from an enumerated set of values, such as "not started," "in progress," or "complete." As another example, a task status field may be set to a numerical value representing a percentage of the task that has been completed. Various other types of task status fields may be stored. Depending on the value of the task status field, the graphical user interface may display the task icon differently. For example, different colors or sizes of task icons may be used for different discrete values and/or ranges of values in a task status field. A red icon might therefore represent a task that has not been started, while a green icon might represent a task that is in progress. As another example, entirely different task icons may be utilized to depict tasks objects, depending on the value of a task status field.

In an embodiment, an icon may be customized based on the value of any field within a task object, regardless of whether the field is a task status field. Moreover, a task icon may be customized based on multiple types of fields within the same task object, and the graphical user interface may modify the task icon differently for each field. For instance, different colors may be assigned based on a first task object field that indicates whether the task object has been started or is complete, while different icons sizes may be assigned based on a second task object field that indicates whether a task is currently assigned to a user.

Optional block 260 comprises moving the first icon on the map in response to determining that the task object is now associated with a new geographic location. For example, in some embodiments, a task object is mobile. For example, re-assigning the location of a task object may be necessary when a first element of a task has been completed at one location, but a field analyst determines that the next element must be performed at another location. The task object may thus be assigned a new location using any suitable interface. Similarly, it may be desirable to re-assign the location of a task object when the task object is attached to another mobile data object, such as a data object used to represent a user, vehicle, or mobile asset. The attached data object may be updated based on, for instance, tracking logs from a tracking device associated with the mobile data object. Based on a trigger associated with the attached data object and/or a link between the task object and the attached data object, the task object is thus also assigned to the new location.

Optional block 270 comprises storing an association between the task object and a particular user object. In an embodiment, the association indicates that the task object is assigned to the particular user object. A user corresponding to the particular user object may thus, for instance, receive a message describing the task object, view the task object in a list or map of task objects currently assigned to the user, and/or update the task object in a task manipulation interface. However, other types of associations may also exist between task objects and user objects. Moreover, in some embodiments, a task object may be associated with a group of user objects, such as a team object representing a team of users.

In an embodiment, block 270 may comprise displaying, on the map, a plurality of task icons representing a plurality of task objects that have not been assigned to user objects. Block 270 may further comprise displaying a plurality of user icons representing the user objects as a list of items, or in any other configuration, in an interface area adjacent to the map. The graphical user interface receives input that drags a particular user icon over a task icon. Responsive to this input, an association is stored between the task object that corresponds to the task icon and the user object represented by particular user icon.

In an embodiment, block 270 may comprise selecting a particular user object. For example, the particular user object may correspond to a current user of the graphical user interface, or another user identified by the current user. A location of the particular user object is identified or determined. Distances between the location and locations associated with task objects are determined. A list of task objects is created, sorted by distance from the particular user object. Or, a map of the closest task objects to the particular user object is shown. Responsive to input selecting a particular task object in the graphical user interface, an association is stored between the particular task object corresponding and the particular user object.

Block 280 comprises receiving input indicating that a task associated with the task object is complete. For instance, a graphical user interface for viewing and manipulating task objects may include controls for changing a task status field from an "in progress" or similar value to "completed." Block 290 comprises, responsive to the input of block 280, updating the task object to have a status of complete. Consequently, the task object will no longer be presented in any display of incomplete or in progress task objects.

Flow 200 is one example of a technique for generating and utilizing a location-sensitive task object. Other flows may include fewer or additional elements in varying arrangements. For example, in an embodiment, a task object may be associated with a plurality of different location fields indicating multiple locations associated with the task object. Each location field may have a pre-defined or user-configurable designation that indicates the significance of the location field. For instance, different locations may be associated with different sub-elements of the task, and/or different attached objects. A map interface may display a task object at all of its indicated locations, a currently active location, or a location having a particular designation.

3.2. Tasks with Attachments

Figure 3:
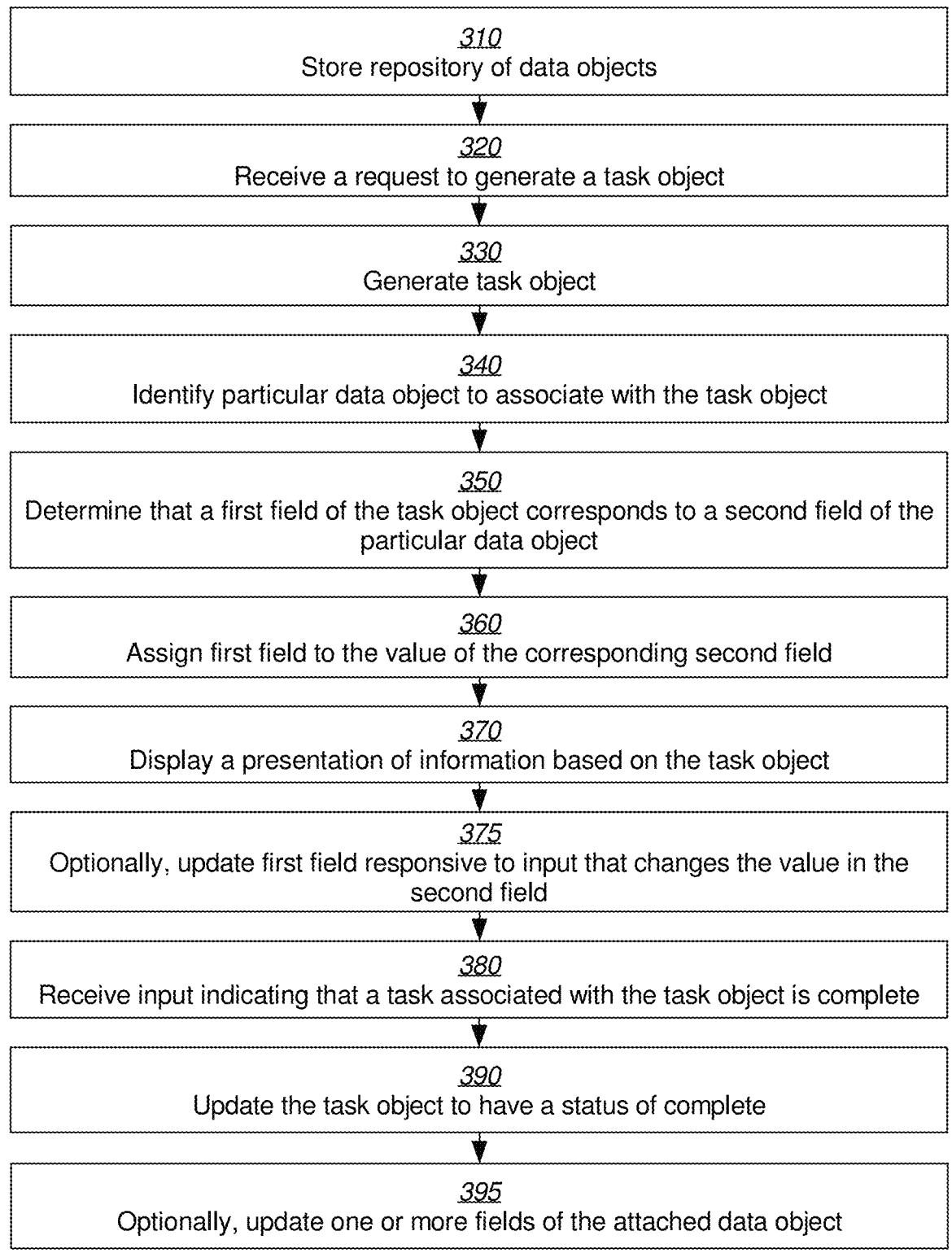
FIG. 3 illustrates an example flow for assigning a task object field based on an associated data object.

According to an embodiment, a user who has identified actions to perform based on data objects such as described herein may utilize the systems and/or techniques described herein to create task objects that are "attached" or otherwise associated with other data objects. In an embodiment, certain task object fields may inherit, import, or otherwise be assigned to values found in existing fields of associated data objects. FIG. 3 illustrates an example flow 300 for assigning a task object field based on an associated data object, according to an embodiment.

Block 310 comprises storing a repository of data objects, such as described in other sections. Block 320 comprises receiving a first request to generate a task object that describes a task, such as described with respect to block 210. Block 330 comprises, responsive to the first request, generating the task object, such as described with respect to block 215.

Block 340 comprises identifying, in the repository of data objects, a particular data object to associate with the task object. For instance, the particular data object may be a report object, event object, asset object, user object, resource object, or any other suitable data object.

In an embodiment, the first request specifies an identifier for the particular data object. For instance, while viewing information associated with the particular data object in a map, graph, or other suitable presentation, the user may have selected a control for requesting to create a task object that is associated with the particular data object. A request that includes the identifier may have been generated and sent to a task object generation component. As part of generating the task object, the particular data object corresponding to the identifier is located. A link between the task object and the particular data object may optionally be created.

In an embodiment, block 340 comprises receiving a second request to attach the particular data object to the task object, subsequent to the first request. For instance, a graphical user interface may display a representation of the task object. The graphical user interface may also display various representations of other data objects, such as a second icon representing the particular data object. In response to receiving input that drags the second icon over the representation of the task object, the second request may be generated, including an identifier for the particular data object. A link between the task object and the particular data object may optionally be created. As another example, a menu for editing fields of the task object may include an attachment control. Upon clicking or otherwise selecting the attachment control, a user may browse various data objects and select one or more data objects to attach to the task object.

In an embodiment, block 340 comprises receiving input that identifies a geographic location to associate with the task object. In this embodiment, block 340 further comprises determining to associate the particular data object with the task object based on comparing the geographic location to one or more location fields in the particular data object. For instance, upon creating a location-sensitive task object per the techniques described in other sections, a task object may automatically be attached to the closest data object of a certain type, such as a user object or event object. In another embodiment, an association between the task object and the closest data object may be suggested via the graphical user interface. The user is given an option to confirm the association.

Block 350 comprises determining that a first field of the task object corresponds to a second field of the particular data object. For instance, block 350 may involve determining that the second field has a same name as the first field. Or block 350 may comprise determining that the first field and the second field both represent a location attribute, object title, assigned user, or assigned user group.

In some embodiments, the task object is of a task object data structure type that comprises values for task object fields. The particular data object, meanwhile, conforms to a particular data object structure type that defines particular fields of the particular object. Block 350 may thus comprise comparing first definition data for the task object data structure type to second definition data for the particular data object structure type to identify similar fields. In an embodiment, block 350 may comprise determining that the second field and the first field descend from a common structural element of a common object type definition. In an embodiment, predefined mappings of corresponding fields in different object types may be stored within the data repository. Thus, block 350 may comprise locating, in a plurality of data structure type mappings, a mapping between the particular data object structure type and the task object data structure type, and determining that the first field corresponds to the second field based on the mapping.

Block 360 comprises assigning the first field of the task object to the value of the corresponding second field. For instance, block 360 may comprise copying the value of the corresponding second field to the first field of the task object while generating the task object and/or responsive to the second request to attach the particular object to the task object. In an embodiment, the first field may not necessarily store the value of the corresponding second field, but rather be linked to the second field of the particular data object. Thus, when the value of the first field is requested, the value of the linked second field is returned. In an embodiment, block 360 is only performed if the first field of the task object is empty, thus ensuring that no data is inadvertently overwritten. In other embodiments, however, it may be preferred to overwrite the first field.

Block 370 comprises displaying a presentation of information based on the task object. A task object may be depicted in varying forms in a variety of contexts, including as an icon or other component of a map, as an item in a list of task objects, as a node in a node-based graph that interconnects the task object with other attached data objects, as a task progress report, and so forth.

Optional block 375 comprises updating the first field of the task object responsive to input that changes the value in the second field of the particular data object. For instance, a trigger may be associated with the second field, such that when the value of the second field changes, the value of the first field also changes. Alternatively, block 375 comprises updating the second field of the particular data object responsive to input that changes the value in the first field of the task object, in similar manner.

Block 380 comprises receiving input indicating that a task associated with the task object is complete, such as described with respect to block 280. Block 390 comprises, responsive to the input of block 380, updating the task object to have a status of complete, such as described with respect to block 290.

Optional block 395 comprises, responsive to updating the task object in block 390, updating one or more fields of the attached data object. For instance, a user may submit input indicating that the task corresponding to the task object is complete. Responsive to the input, and based on the association between the task object and the particular object, a status field of the particular object may be automatically updated to a new status, such as a "work order closed" status or other status.

Flow 300 is one example of a technique for assigning the value of a task object field based on an associated data object. Other flows may include fewer or additional elements in varying arrangements. For example, in an embodiment, a similar flow may be utilized to assign values to multiple fields of the task object, based on values stored in multiple fields of the particular data object. As another example, in an embodiment, a second data object may be associated with the task object, and another field of the task object may be assigned to a value from a corresponding field of the second data object.

4.0. Example User Interfaces

The drawings discussed in this section are examples of the many types of presentations and interfaces that may be generated based on the data objects, systems, and/or techniques described herein. The information and data objects depicted in these drawings are given by way of example. The interface techniques may be extended to any types of task objects and data objects supported by the systems described herein. Other interfaces may include fewer, additional, or different elements in varying arrangements.

4.1. Example Task Creation/Editing Interface

Figure 4:
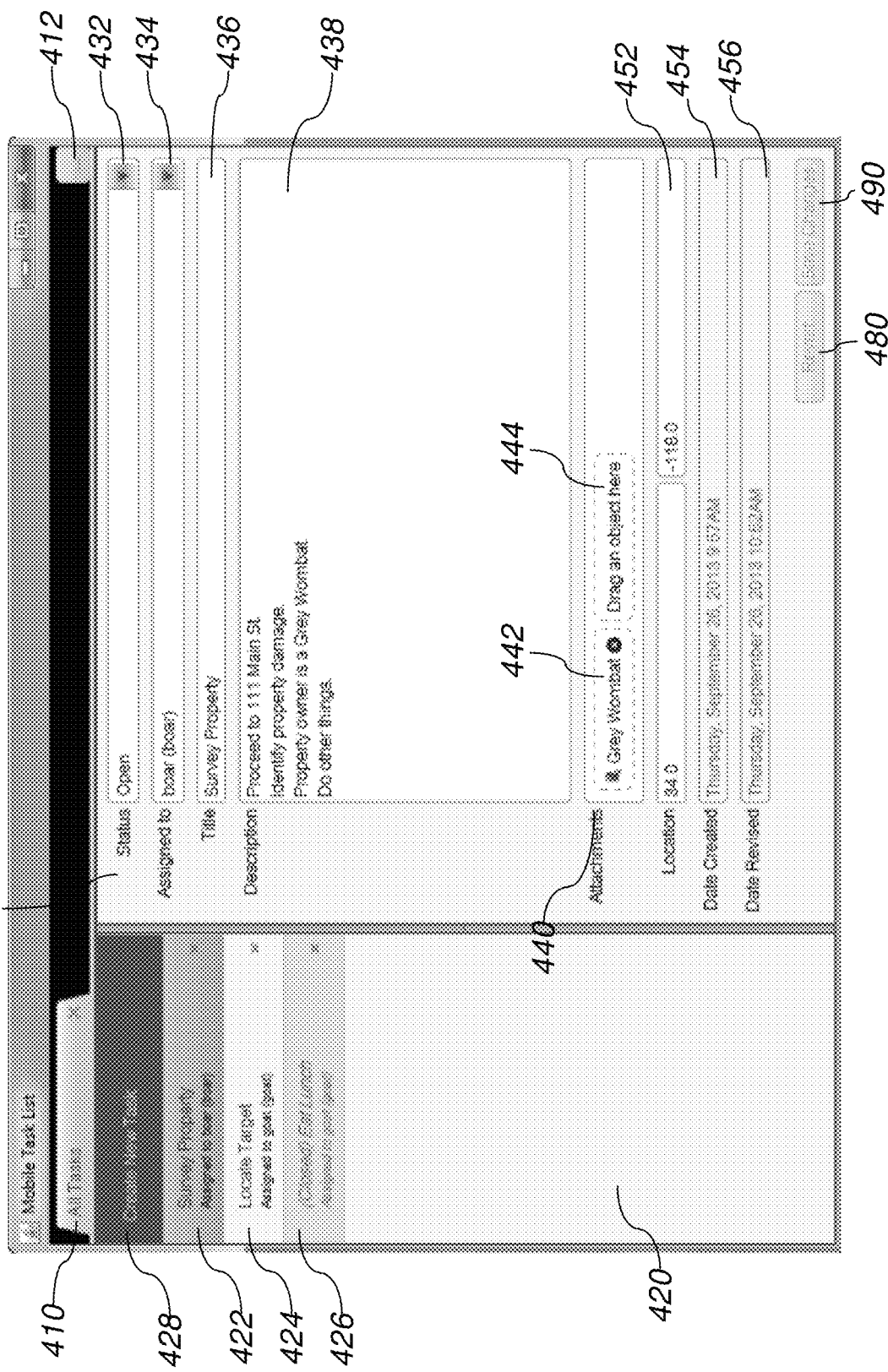
FIG. 4 illustrates an example interface for creating task objects and/or viewing information associated with existing task objects.

FIG. 4 illustrates an example interface 400 for creating task objects and/or viewing information associated with existing task objects, according to an embodiment. Interface 400 comprises a tab 410 for viewing a selected group of tasks. Additional tabs 410 for other groups of tasks may be added using control 412. Interface 400 further comprises task list 420 for selecting a task object for which to display information in task information area 430. Task list 420 includes items 422-426, each corresponding to a pre-existing task object.

Task information area 430 shows values from various fields of the task object whose list item 422-426 is selected in task list 420. Each of the values is shown in a field control 432-456 that also permits editing of the corresponding value. Each control 432-456 includes a label indicating the name of the task object field that corresponds to the control 432-456. Controls 432-456 include a status field control 432, an assigned user field control 434, a title field control 436, a description field control 438, attachment field controls 440-444, location field controls 452, a creation timestamp field control 454, and a revision timestamp field control 456. Controls 454-456 are shaded in gray to indicate that the corresponding fields are not editable.

Attachment control area 440 lists all objects that have been attached to the depicted task object. For each attached object, there is an attached object control 442. A user may launch a presentation of information concerning the attached object by selecting control. Attached object control 442 may further be deleted to remove the attachment from the task object.

Attachment control area 440 further includes a control 444 for adding a new attachment. Over this control 444, a user may drag and drop an icon representing another object from another interface area (not depicted), such as a graph, object list, or map. In response, the other object is attached to the task object. Alternatively, a user may click on control 444 to browse other objects and locate a new object to attach. In an embodiment, upon attaching a new object via control 444, various fields 432-438 and 452 are updated to include values from corresponding fields of the newly attached object, using techniques described in other sections.

In an embodiment, fields 432-438 and 452 are updated in this manner only if they are empty. In an embodiment, upon attaching a new object, interface 400 will generate a prompt that asks the user if the user wishes to import certain values from the newly attached object into certain fields 432-438 and 452.

Interface 400 further includes a save control 490 that saves any changes made to the task object via controls 432-456. Interface 400 further includes a reversion control 480 that discards any changes made to the task object via controls 432-456.

Above task list 420 is a task creation control 428. Upon selecting task creation control 428, the controls 432-456 are reset to empty or default values. Using controls 432-456, the user may assign values to various task object fields. The user may then click on control 490 to request that a new task object having the assigned values be created. A new item 422-426 will then appear in task list 420, reflecting the newly created task object.

4.2. Example Mobile Interfaces

Figure 5:
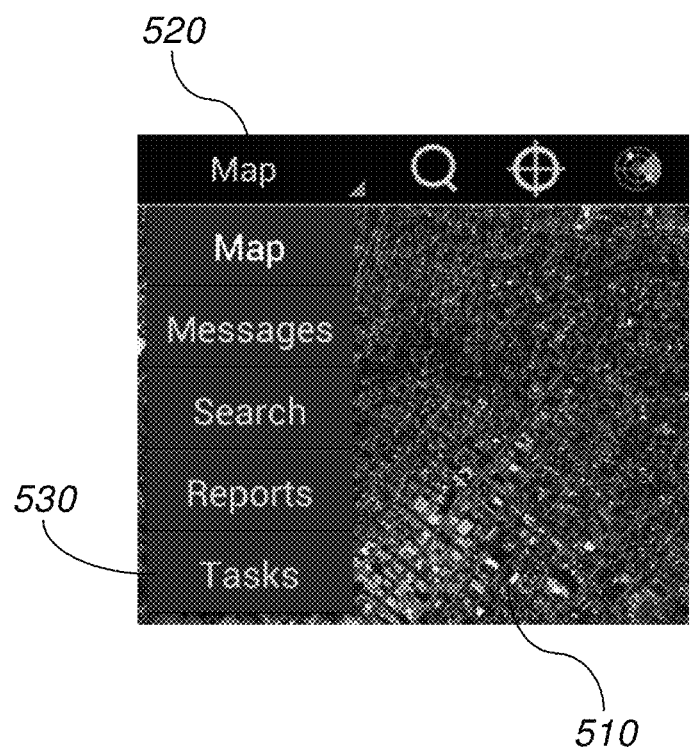
FIG. 5 illustrates an example mobile map interface.

FIG. 5 illustrates an example mobile map interface 500, according to an embodiment. Map interface 500 comprises a map area 510 on which object icons, including icons representing task objects and other data objects, may be depicted. Interface 500 includes an activated pull-down menu 520 for accessing various data presentations, including a task control 530 for accessing a presentation of task objects.

Figure 6:
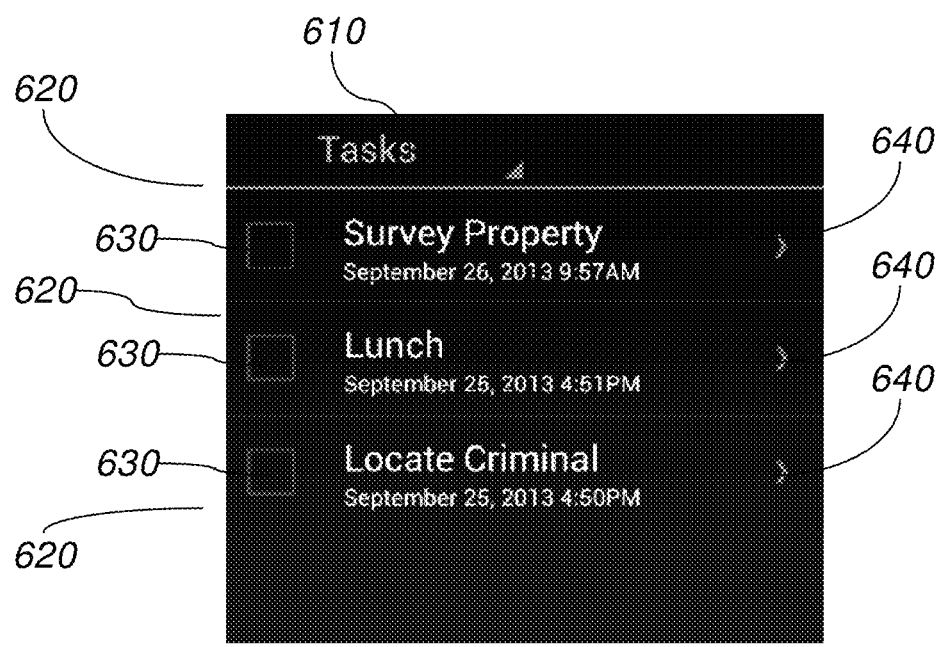
FIG. 6 illustrates an example mobile task list interface for viewing a list of task objects.

FIG. 6 illustrates an example mobile task list interface 600 for viewing a list of task objects, according to an embodiment. Interface 600 comprises an inactive pull-down menu 610 that provides functionality similar to pull-down menu 520. Interface 600 further comprises items 620, each of which represents a different task object. Specifically, each item 620 includes a title of the respectively represented task object and a date of the respectively represented task object, which may be a due date, revision date, or creation date, depending on the embodiment. For each item 620, there is a check box 630 for submitting input indicating that the status field value of the respectively represented task object should be marked as "complete." For each item 620, there is also a control 640 for launching another interface for viewing more detailed information about the represented task object. In an embodiment, items 620 have been filtered to include only task objects that are assigned to a user that has logged into the interface 600, or a team to which the user is assigned. In other embodiments, there may be different task interface screens 600 for different groups of task objects, including task objects assigned to different users or user groups, unassigned task objects, task objects due within a certain time period, tasks objects associated within a certain proximity to a specific location, and so forth.

Figure 7:
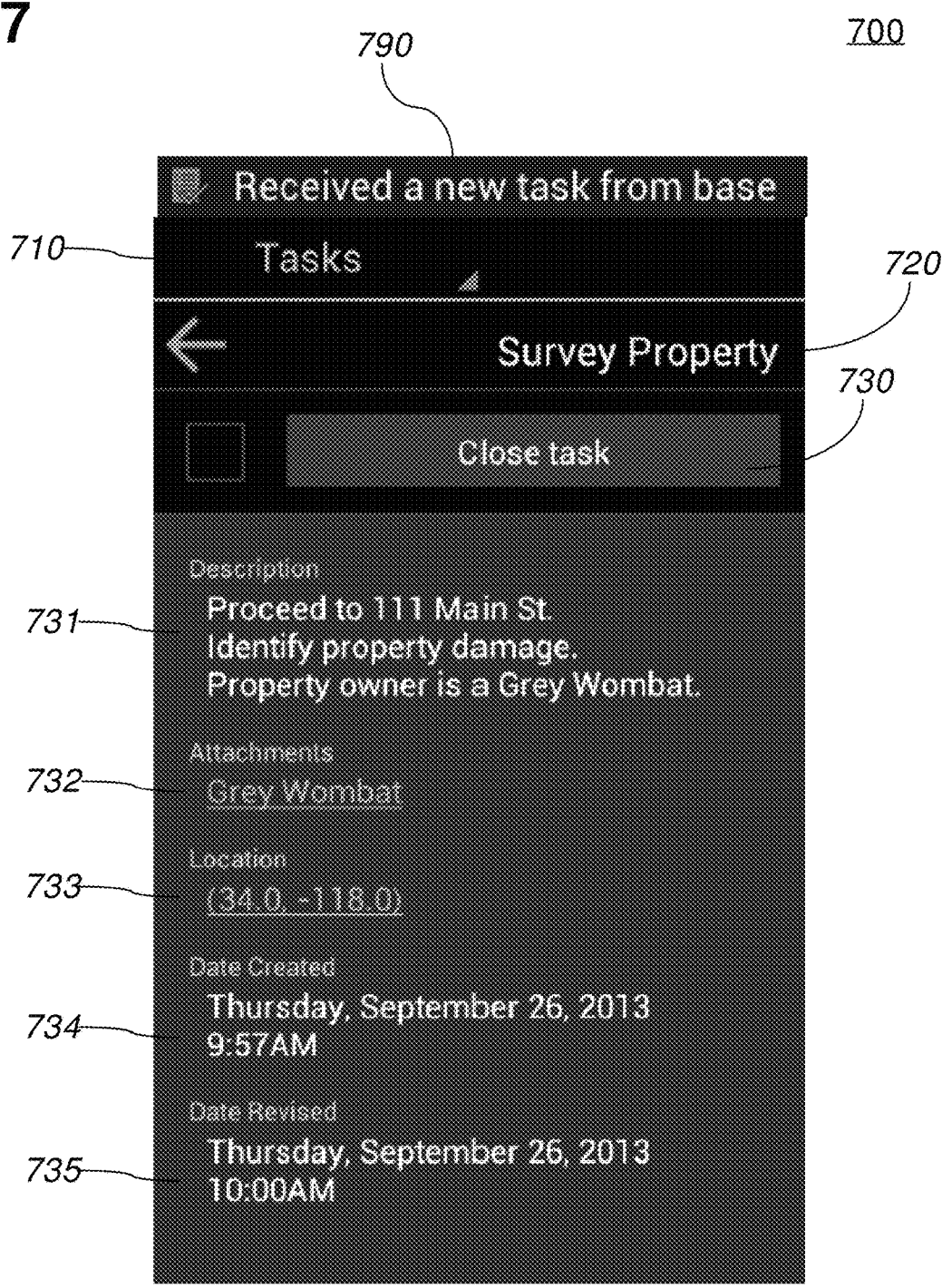
FIG. 7 illustrates an example mobile task information interface for viewing information about a specific task object.

FIG. 7 illustrates an example mobile task information interface 700 for viewing information about a specific task object, according to an embodiment. Interface 700 comprises a pull-down menu 710 similar to pull-down menu 610. Interface 700 further comprises a task title display 720 that displays the value of a title field of a task object. Interface 700 further includes other display elements for various fields of the task object, including a description field display 731, attachment field display 732, location field display 733, creation date field display 734, and revision date field display 735. Attachment field display 732 includes a hyperlink for each attached object, by which a user may request an interface for viewing more information about the assigned object. Location field display 733 includes a hyperlink by which a user may launch a map interface, such as map interface 500, centered upon the location associated with the task object.

Interface 700 further comprises a message notification area 790 that alerts a user to the existence of a new task object or a newly assigned task object. Message notification area 790 may be part of the same application that displays the other components of interface 700, or may be an overlay generated by an operating system or other messaging application. In an embodiment, a user may select message notification area 790 when it appears, in order to launch an interface 700 for viewing information about the new task object. In other embodiments, selecting message notification area 790 may launch other interfaces in which the new task object may be depicted, such as map interface 500 or task list interface 600. In an embodiment, message notification area 790 only appears when a new task object meeting certain criteria has been created. For instance, message notification area 790 may only appear when a task object is newly assigned to the user who is logged into interface 700, or to a user group that includes the user. As another example, message notification area 790 may also appear when an unassigned task object is located within a certain proximity of the user's mobile device. The text in message notification area 790 may vary depending on the relationship between the new task object and the user. In an embodiment, a user may receive other new task notifications in addition to or instead of that found in message notification area 790, such as via email or text message.

Figure 8:
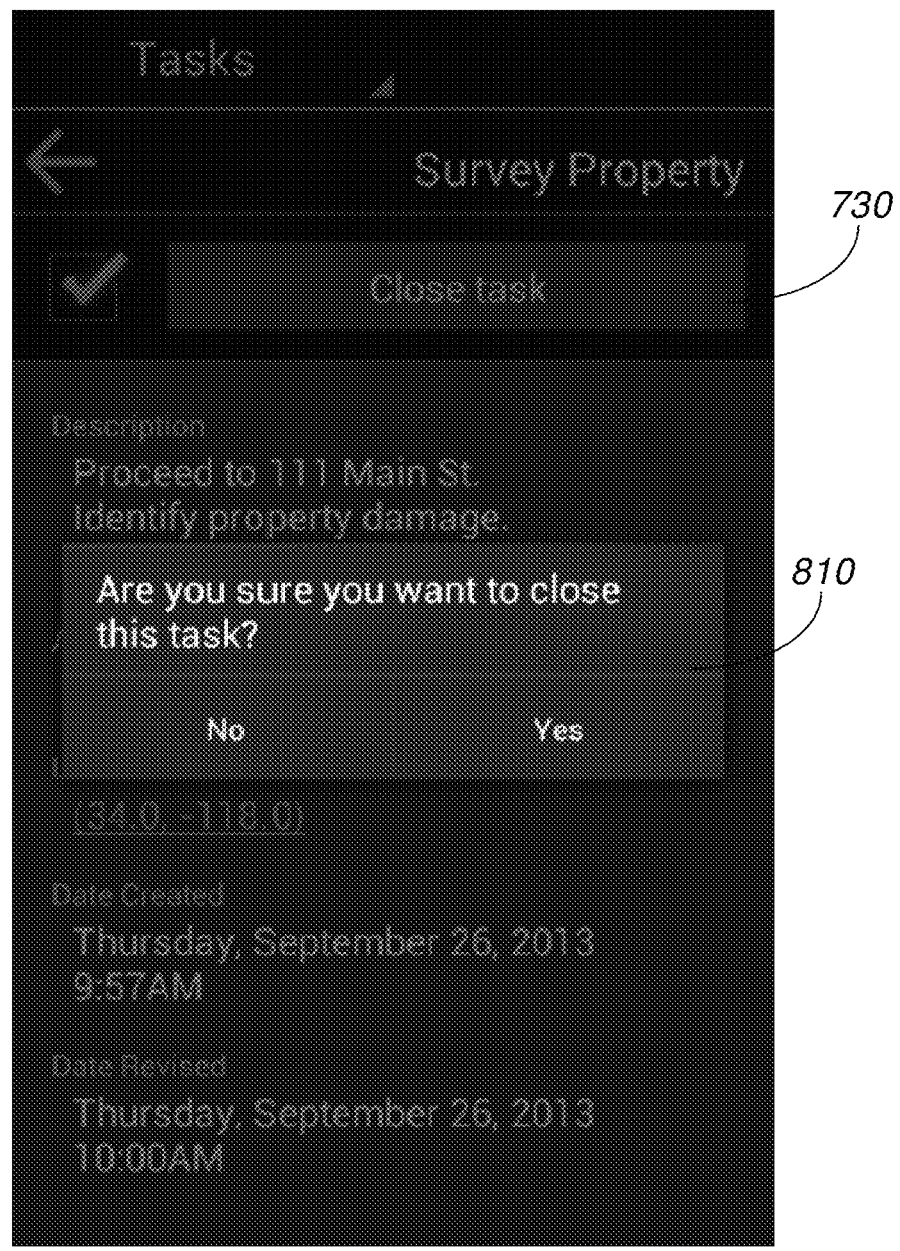
FIG. 8 illustrates another example mobile task information interface for viewing information about a specific task object.

Interface 700 further includes a task completion checkbox 730 configured for submitting input that requests to mark the task object as complete. FIG. 8 illustrates another example mobile task information interface 800 for viewing information about a specific task object, according to an embodiment. Interface 800 is the same as interface 700, except that task completion checkbox 730 has been checked, and consequently a confirmation message 810 is displayed asking the user to confirm whether the user intends to close the task object.

Figure 9:
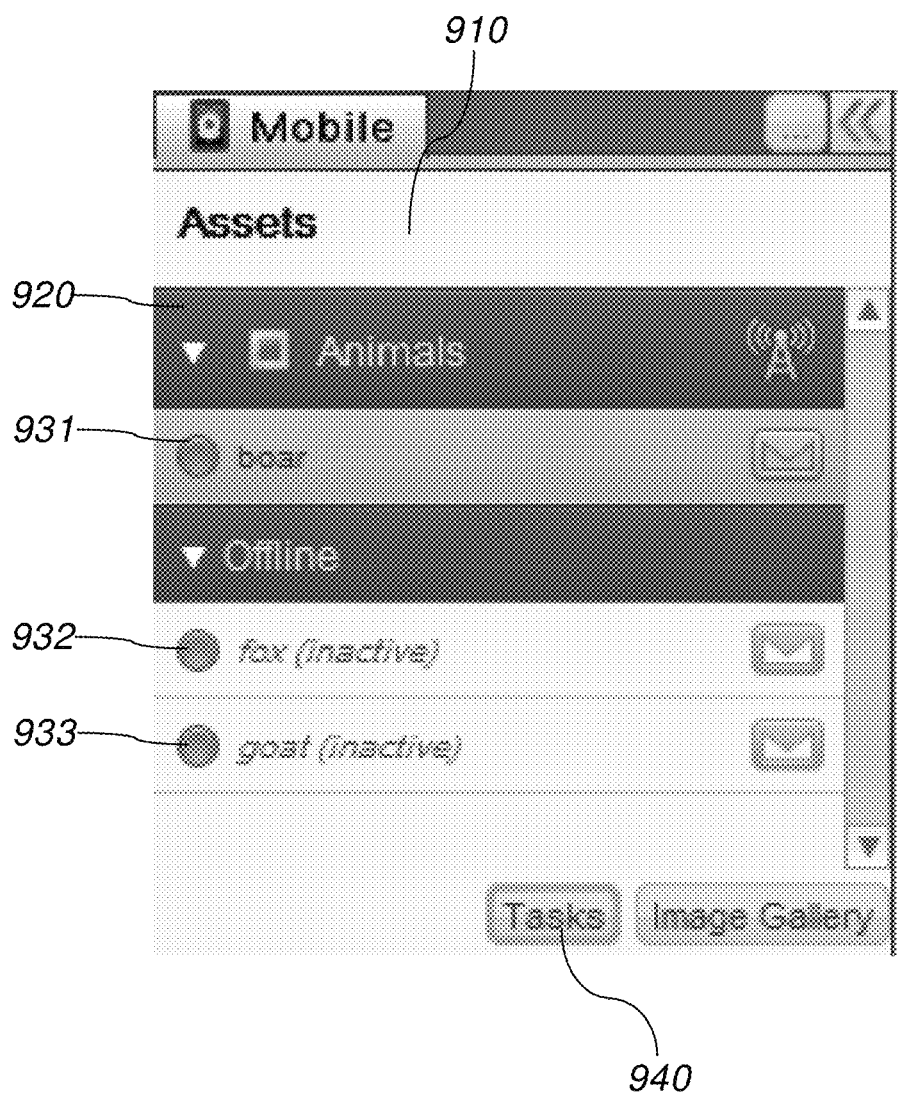
FIG. 9 illustrates an example mobile interface in which information about task objects may be located.

FIG. 9 illustrates an example mobile interface 900 in which information about task objects may be located, according to an embodiment. Interface 900 comprises an asset object list 910. Items 931-933 of object list 910 represent various asset objects. Items 931-933 are organized according to teams 920, and may further be organized by online/offline status. A user may select one of items 931-933, and then click on a task button 940. Upon clicking on the task button 940, a task list interface such as interface 600 may appear, listing all task objects assigned or attached to the asset object corresponding to the selected item 931-933. In other embodiments, interface 900 may further comprise a task creation button configured to request creating a task that is attached to the selected asset object. Similar interfaces 900 may exist for other types of data objects.

5.0. Example Mobile System Architecture

Figure 10:
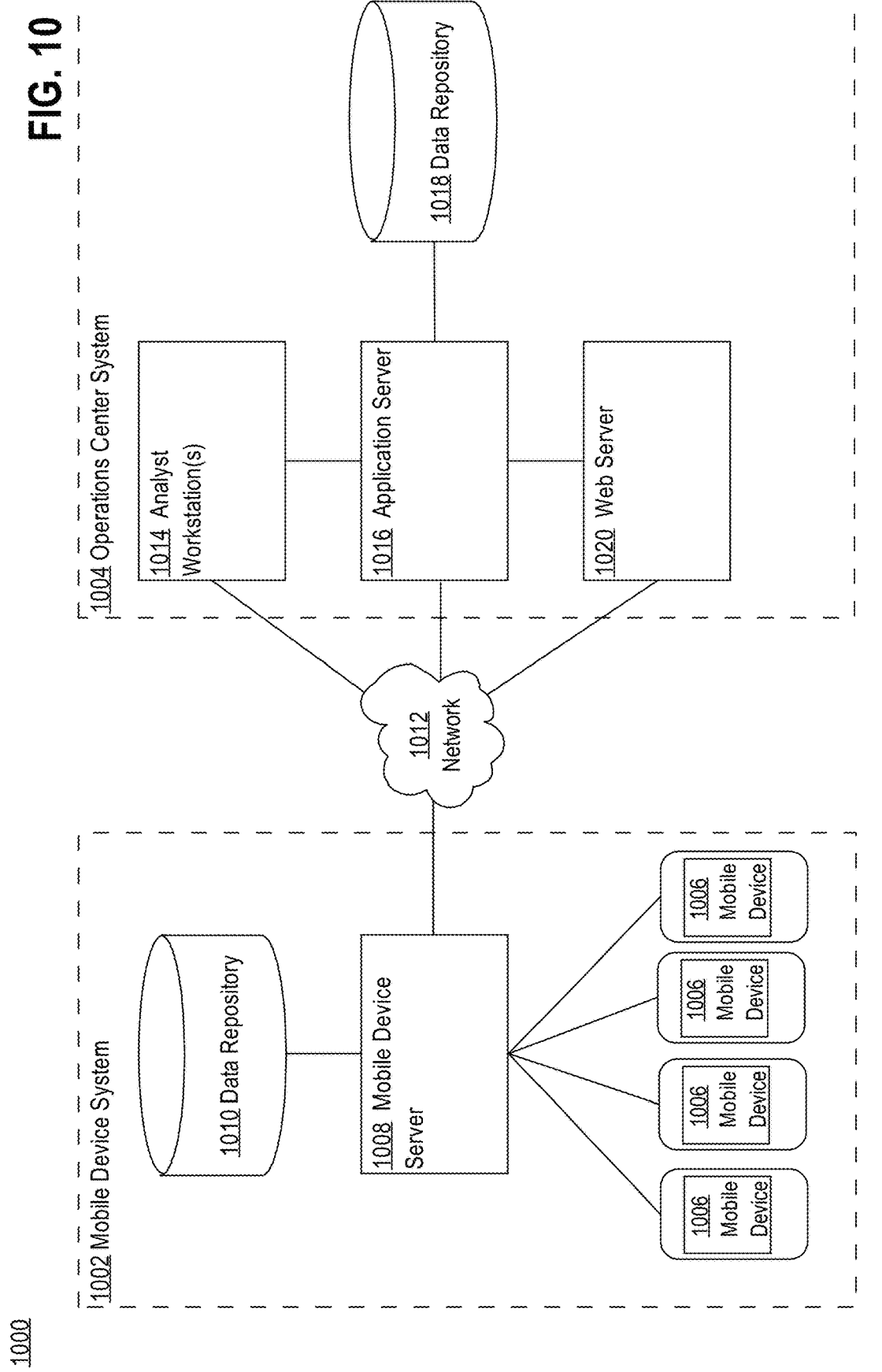
FIG. 10 illustrates an example of a mobile data analysis system in which the techniques described herein may be practiced.

FIG. 10 illustrates an example of a mobile data analysis system 1000 in which the techniques described herein may be practiced, according to an embodiment. A mobile data analysis system 1000 generally facilitates the communication and the exchange of data between one or more mobile devices (e.g., mobile devices 1006), one or more analyst workstations (e.g., analyst workstations 1014), and information stored in one or more data repositories (e.g., data repositories 1010, 1018). The example mobile data analysis system 1000 is conceptually described herein as comprising a mobile device system 1002 supporting one or more mobile devices 1006 and that is interconnected over a network 1012 to an operations center system 1004 supporting one or more analyst workstations 1014 and other computing resources; however, the mobile data analysis system 1000 represents just one system arrangement and other system arrangements are possible.

In an embodiment, a mobile device system 1002 comprises mobile devices 1006, mobile device server 1008, and data repository 1010. Each of mobile devices 1006 generally may comprise any mobile computing device including, without limitation, a smartphone, a cellular phone, a tablet, a laptop, and a personal digital assistant (PDA). Each of mobile devices 1006 is communicatively coupled to mobile device server 1008 via one or more wireless links that may include, for example, cellular, Wi-Fi, WiMAX, ZigBee, microwave, and other wireless network links. For the purposes of illustrating a clear example, four mobile devices 1006 and one mobile device server 1008 are shown in FIG. 10, but practical implementations may use hundreds or thousands of mobile devices and any number of mobile devices servers.

In an embodiment, mobile device server 1008 may be communicatively coupled to resources of operations center system 1004 via network 1012, which broadly represents one or more local area networks, wide area networks, global interconnected internetworks such as the public internet, or a combination thereof. Mobile device server 1008 generally may be configured to coordinate communication between mobile devices 1006 and resources of operations center system 1004 and to access and retrieve data stored in data repository 1010. For example, mobile device server 1008 may be configured to relay search requests, messages, and other data sent from mobile devices 1006 to resources of operations center system 1004, and to send information received from operations center system 1004 to the appropriate mobile devices 1006.

In an embodiment, operations center system 1004 comprises one or more analyst workstations 1014, application server 1016, data repository 1018, and web server 1020. One or more components of operations center system 1004 may, for example, be located in a centralized location that is remote from mobile device system 1002 and mobile devices 1006.

In an embodiment, analyst workstations 1014 comprise one or more workstation computers, server computers, laptop computers, mobile devices, or combinations thereof. Analyst workstations 1014 generally are configured to support one or more operations analysts that may request information provided by application server 1016 and/or web server 1020, send information to application server 1016 to be stored in data repository 1018, communicate with one or more field analysts using mobile devices 1006, and perform other operations described herein.

In an embodiment, application server 1016 generally is configured to access and retrieve data stored in data repository 1018 in response to requests from mobile devices 1006, mobile device server 1008, analyst workstations 1014, and web server 1020. Application server 1016 may perform data manipulations and other operations in response to receiving requests to access and/or store data in data repository 1018.

In an embodiment, data repository 1018 is the same as the one or more repositories 120 of FIG. 1, while application server 1016 and web server 1020 collectively implement other components of system 100. However, in other embodiments, the correspondence between the components of system 100 and system 1000 may vary.

5.1. Mobile Device System Architecture

Figure 11:
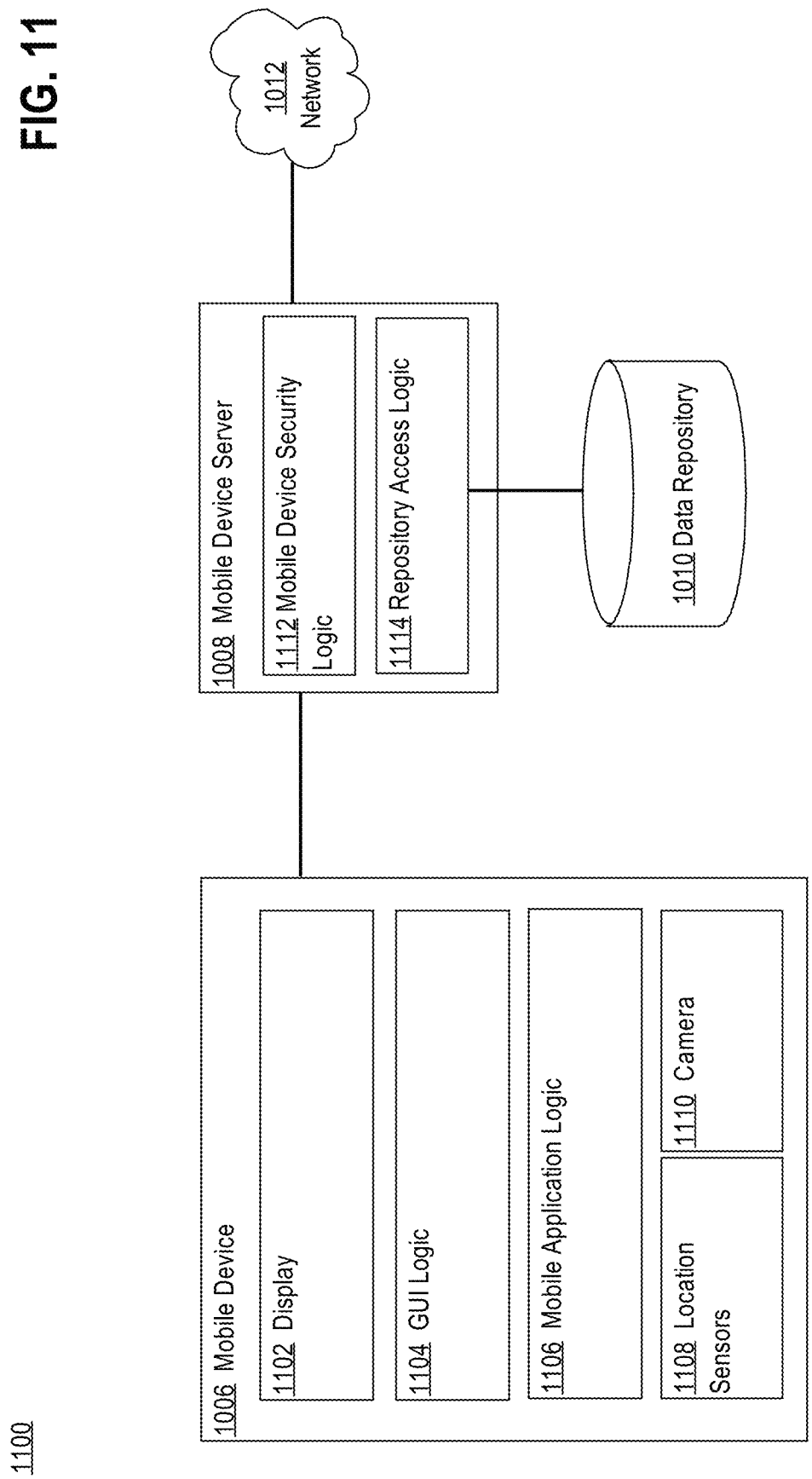
FIG. 11 illustrates an example mobile device system architecture.

FIG. 11 illustrates an example mobile device system architecture 1100, according to an embodiment. In an embodiment, a mobile device system architecture 1100 comprises one or more mobile devices 1006, mobile device server 1008, and data repository 1010.

In the embodiment illustrated in FIG. 11, a mobile device 1006, which may be implemented by one or more physical computing devices, is communicatively coupled to mobile device server 1008, which may be implemented by one or more second physical computing devices, over one or more wireless networks. A mobile device 1006 comprises a display 1102, graphical user interface (GUI) logic 1104, mobile application logic 1106, location sensors 1108, and camera 1110.

In an embodiment, GUI logic 1104 may be a set of program instructions which, when executed by one or more processors of a mobile device 1006, are operable to receive user input and to display a graphical representation of one or more graphic constructs related to the mobile data analysis system approaches described herein. As an example, a mobile device 1006 may be a smartphone and GUI logic 1104 may be operable to receive touch screen signals and other user input from, and display the graphics constructs to, a graphical user interface that is provided on display 1102. Touch screen signals may comprise selecting buttons, holding down buttons, selecting items displayed on the screen, dragging, or other gestures or selections. In general, GUI logic 1104 is configured to receive user input and determine what user requests or commands are represented by the user input.

In an embodiment, a mobile device 1006 includes mobile application logic 1106, which may comprise firmware, hardware, software, or a combination thereof in various embodiments that is configured to implement the functions of a mobile data analysis system on a mobile device as described herein. In one embodiment, mobile application logic 1106 may be implemented as part of an application program configured to execute on the Android operating system. In other embodiments, mobile application logic 1106 may be implemented as a combination of programming instructions written in any programming language (e.g., C++ or Java) and hardware components (e.g. memory, CPU time) that have been allocated for executing the program instructions on a mobile device 1006.

In an embodiment, location sensors 1108 generally represent any sensors which may be used to determine information associated with a geographic location, spatial orientation, device movement, or any other information associated with the physical presence of a mobile device 1006, and which may be referred to herein as location data. Location data may include, for example, latitudinal and longitudinal coordinates, elevation measures, cardinal direction information, movement information, etc. For example, location sensors 1108 may comprise a Global Positioning System (GPS) component, motion sensors (e.g., an accelerometer), rotation sensors (e.g., a gyroscope), a compass, and a magnetometer. In an embodiment, mobile application logic 1106 is operable to receive location data from location sensors 1108 and to send the location data to a mobile device server 1008, which in turn may send the location data to resources of operations center system 1004. The receiving and sending of location data by mobile application logic 1106 may be performed periodically, at user configured intervals, or based on any other schedule.

In an embodiment, camera 1110 generally represents any component capable of capturing multimedia information such as images, video, and sound. Camera 1110 may be integrated into a mobile device 1006 or may be an external device communicatively coupled to a mobile device 1006.

In an embodiment, mobile device server 1008 comprises mobile device security logic 1112 and repository access logic 1114.

In an embodiment, mobile device security logic 1112 provides processes for controlling access to the mobile data analysis system by mobile devices. For example, access by mobile devices 1006 to mobile device server 1008, and via mobile device server 1008 to resources of operations center system 1004 over network 1012, may be restricted and/or secured. As such, access by a mobile device user to a mobile device 1006 and/or mobile device server 1008 may be based on the user supplying an authorized mobile device user account and associated passwords, secret questions, personal identification numbers (PINs), biometrics, and/or any other suitable authentication mechanism. Mobile device security logic 1112 comprise a set of program instructions configured to process mobile device user login requests sent from a mobile device 1006.

In one embodiment, user access to a mobile device 1006, mobile device server 1008, and one or more of the resources of operations center system 1004 may be protected by separate authentication mechanisms. In another embodiment, mobile device security logic 1112 may be configured to implement a Single Sign-On (SSO) access control system in order to provide a single point of authentication for mobile device users. An SSO access control system generally enables a system resource, such as mobile device server 1008, to process access credentials supplied by a mobile device user and, if a successful login occurs, to grant an authenticated user account access to resources located on other system resources, such as the resources of operations center system 1004, and without the mobile user manually authenticating with the other systems.

In an embodiment, communication between mobile devices 1006, mobile device server 1008, and resources in operations center system 1004 may be secured using a cryptographic communication protocol such as, for example, the Secure Sockets Layer (SSL) protocol. For example, each of mobile devices 1006 may be configured for secure communications by installing a public key security certificate on the mobile devices and a corresponding private key security certificate on mobile device server 1008 and resources of operations center system 1004. Mobile device security logic 1112 may comprise instructions configured to send and receive encrypted network traffic based on the installed security certificates, whereby the mobile device security logic 1112 encodes outgoing data with the public key security certificate, and mobile devices server 1008 and/or resources of operations center system 1004 decode received data with the installed private key security certificates.

In an embodiment, mobile device security logic 1112 may comprise program instructions configured to restrict mobile device access to mobile device server 1008 based on a whitelist of authorized mobile devices. A mobile device whitelist may be configured by a mobile data analysis system administrator and may include, for example, one or more entries that specify a unique identifier associated with approved mobile devices. The unique identifier may be, for example, a device serial number, an international mobile equipment identity (IMEI) number, a MAC address, or any other identifier that may be transmitted by a mobile device 1006 to mobile device server 1008. In an embodiment, mobile device security logic 1112 may be configured to cause mobile device server 1008 to ignore requests that are sent from a mobile device that does not supply an identifier on the whitelist. A mobile device whitelist may be stored in a database, a spreadsheet, or any other suitable format for storage in a data repository such as data repository 1010.

In an embodiment, mobile device server 1008 comprises repository access logic 1114. Repository access logic 1114 may comprise a set of instructions which, when executed by one or more processors, are operable to access and retrieve data from data repository 1018. For example, repository access logic may be a database client or an Open Database Connectivity (ODBC) client that supports calls to a database server that manages data repository 1018.

In an embodiment, data repository 1010 generally represents any data storage device (e.g., local memory on mobile device server 1008, shared memory, a database, etc.) known in the art which may be configured to store data. In an embodiment, data repository 1010 may store, for example, configuration files, security information, and other data associated with mobile devices 1006. In some embodiments, data stored in data repository 1010 may be accessed by mobile device server 1008 in order to avoid sending requests for the same information to resources of operations center system 1004.

5.2. Operations Center System Architecture

Figure 12:
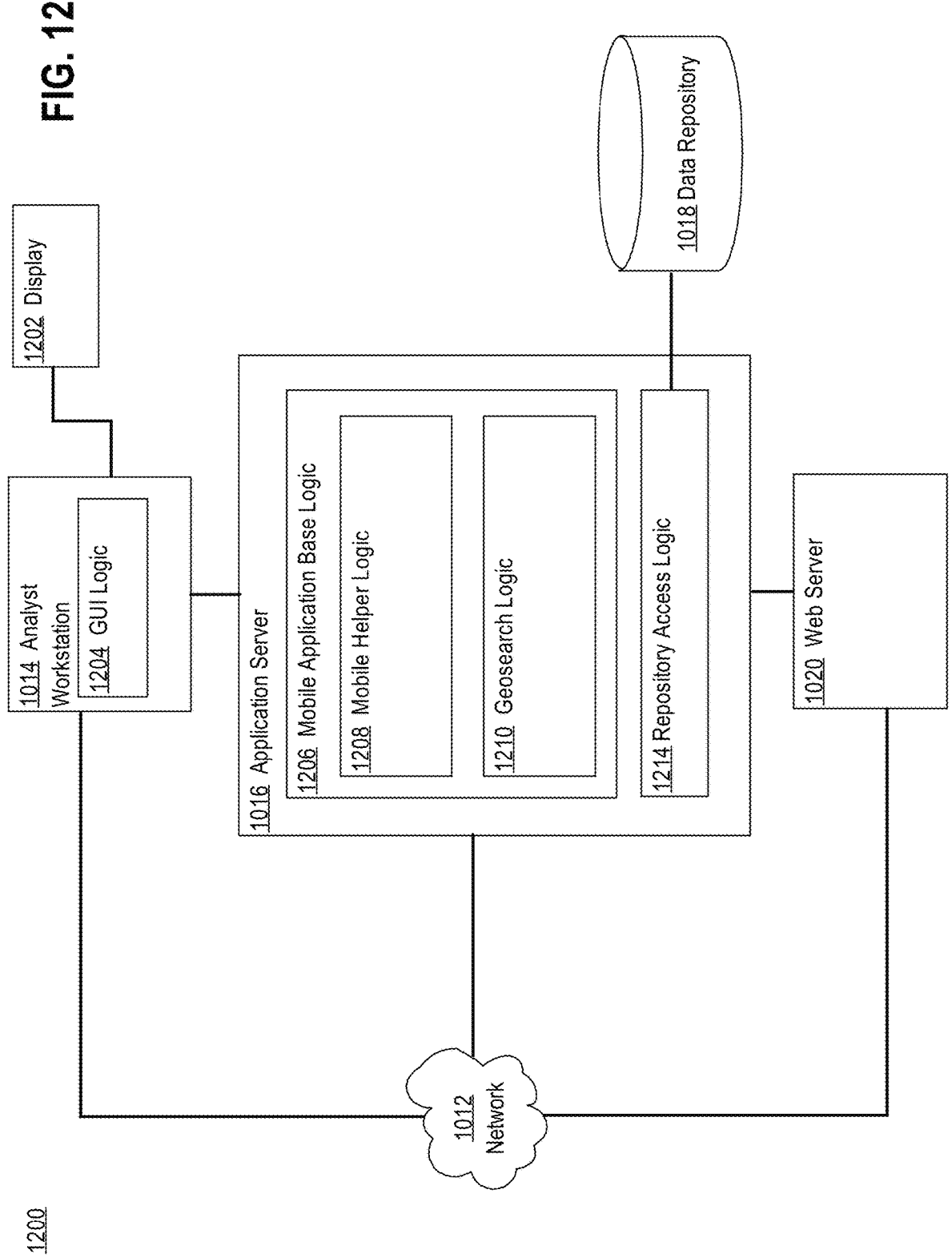
FIG. 12 illustrates an example operations center architecture.

FIG. 12 illustrates an example operations center architecture 1200, according to an embodiment. In an embodiment, operations center architecture 1200 comprises application server 1016, web server 1020, and one or more analyst workstations, such as analyst workstation 1014.

In the embodiment illustrated in FIG. 12, analyst workstation 1014, which may be implemented by one or more physical computing devices, is communicatively connected to application server 1016 and web server 1020, which may be implemented by one or more other physical computing devices, over a network. In some embodiments, each such physical computing device may be implemented as a separate computer system. For example, analyst workstation 1014 may be implemented in a computer system as a set of program instructions recorded on a machine-readable storage medium, while application server 1016 and web server 1020 may be implemented in different computer systems.

Analyst workstation 1014 comprises graphical user interface (GUI) logic 1204. GUI logic 1204 may be a set of program instructions which, when executed by one or more processors of the computer system, are operable to receive user input and display a graphical representation of one or more graphic constructs related to the mobile data analysis approaches described herein. GUI logic 1204 may be operable to receive user input from, and display the graphic constructs to, a graphical user interface that is provided on display 1202 by the computer system on which analyst workstation 1014 executes.

Analyst workstation 1014 may also interact with application server 1016 to provide input, definition, editing instructions, and expressions related to a mobile data analysis system as described herein using a programmatic interface, and then the application server 1016 may use, process, log, store, or otherwise interact with the received input according to application server logic.

In an embodiment, web server 1020 is configured to provide one or more web-based interfaces to resources available from application server 1016 and data repository 1018. As an example, one or more of mobile devices 1006 may comprise a browser that can access HTML documents that web server 1020 generates. The web pages may include information about data stored in data repository 1018. In other embodiments, web server 1020 may use formats other than HTML for transmitting information to requesting devices.

In an embodiment, application server 1016 may be implemented as a special-purpose computer system having the logical elements shown in FIG. 12. In an embodiment, the logical elements may comprise program instructions recorded on one or more machine-readable storage media. Alternatively, the logical elements may be implemented in hardware, firmware, or a combination.

When executed by one or more processors of the computer system, logic in application server 1016 is operable to perform mobile data analysis system operations according to the techniques described herein. In one embodiment, logic in application server 1016 may be implemented in a Java Virtual Machine (JVM) that is executing in a distributed or non-distributed computer system. In other embodiments, logic in application server 1016 may be implemented as a combination of programming instructions written in any programming language (e.g., C++ or Visual Basic) and hardware components (e.g., memory, CPU time) that have been allocated for executing the program instructions.

In an embodiment, application server 1016 comprises repository access logic 1214. Repository access logic 1214 may comprise a set of instructions which, when executed by one or more processors, are operable to access and retrieve data from data repository 1018.

In an embodiment, data repository 1018 may be a type of structured storage for storing data including, but not limited to, relational or object-oriented databases, data warehouses, directories, data files, and any other structured data storage. In one embodiment, data repository 1018 is implemented as a revisioning database system configured to track changes made to data stored in the data repository. In an embodiment, a revisioning database system records metadata about changes to stored data, facilitates UNDO and REDO operations of data changes, can receive requests to subscribe to particular data and publish updates to such data for delivery to subscribers, and perform other functions.

In an embodiment, application server 1016 comprises mobile application base logic 1206. Mobile application base logic 1206 generally includes logic implementing mobile data analysis system operations that may be requested by an analyst workstation 1014 and mobile devices 1006 and comprises mobile helper logic 1208 and geosearch logic 1210.

In an embodiment, mobile helper logic 1208 provides processes for assisting users to observe the location of various data objects in repository 1018, such as one or more task objects or one or more objects representing mobile devices, on a map display. Mobile helper logic mobile device security logic 1112 may comprise program instructions operable to receive and store locational and other data sent from mobile devices and to provide locational and other data in response to requests. The data received, stored, and sent may further include metadata. Mobile helper logic 1208 may further comprise logic operable to transmit messages sent from mobile device and analyst workstation users, perform data object searches, and other functionality described herein.

In an embodiment, geosearch logic 1210 provides processes for handling geosearch requests sent from a mobile device and analyst workstation users. In general, a geosearch request is a search request for data objects or other information that is associated with one or more specified geographic locations or areas.

Systems 1000, 1100, and 1200, along with similar systems and techniques that utilize such systems, are described in greater detail in U.S. patent application Ser. No. 13/831,199, filed Mar. 14, 2013 and entitled "Mobile Reports," the entire contents of which are hereby incorporated by reference for all purposes as if set forth herein. Other examples of systems in which the described techniques may be utilized include, without limitation: U.S. patent application Ser. No. 12/840,673, filed Jul. 21, 2010, U.S. patent application Ser. No. 13/247,987, filed Sep. 28, 2011, and U.S. patent application Ser. No. 13/669,274, filed Nov. 5, 2012. The entire contents of each of the above documents are hereby incorporated by reference for all purposes as if set forth in their entirety herein.

6.0. Implementation Mechanisms—Hardware Overview

According to an embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
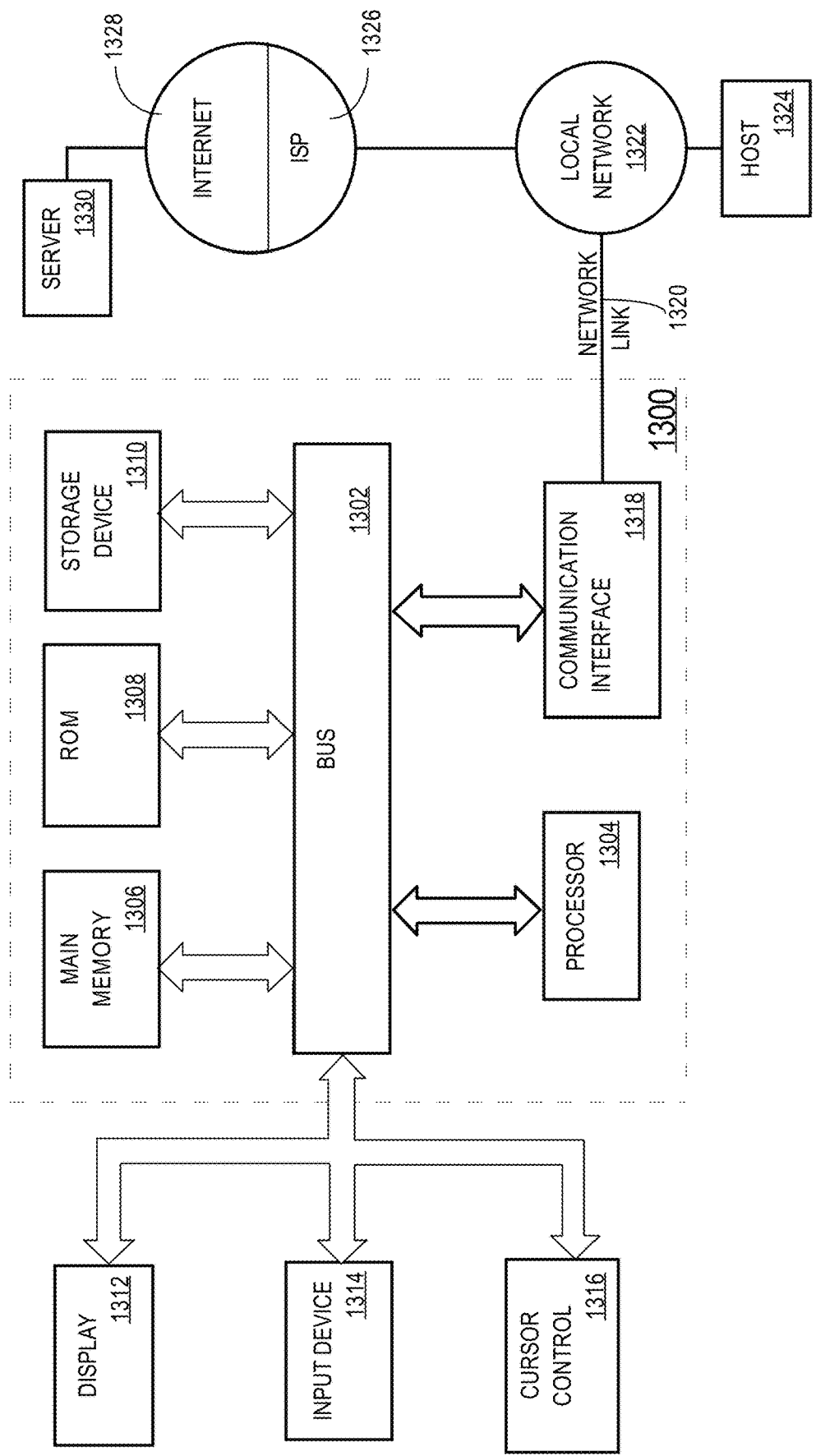
FIG. 13 illustrates a computer system upon which an embodiment may be implemented.

For example, FIG. 13 is a block diagram that illustrates a computer system 1300 upon which an embodiment may be implemented. Computer system 1300 includes a bus 1302 or other communication mechanism for communicating information, and a hardware processor 1304 coupled with bus 1302 for processing information. Hardware processor 1304 may be, for example, a general purpose microprocessor.

Computer system 1300 also includes a main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes a read only memory (ROM) 1308 or other static storage device coupled to bus 1302 for storing static information and instructions for processor 1304. A storage device 1310, such as a magnetic disk, optical disk, or solid-state drive is provided and coupled to bus 1302 for storing information and instructions.

Computer system 1300 may be coupled via bus 1302 to a display 1312, such as a cathode ray tube (CRT), for displaying information to a computer user. An input device 1314, including alphanumeric and other keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 1310. Volatile media includes dynamic memory, such as main memory 1306. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid-state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to a local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to a host computer 1324 or to data equipment operated by an Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, a server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the embodiments, and what is intended by the applicants to be the scope of the embodiments, is the literal and equivalent scope of the set of claims that issue from this application, in the specific form in which such claims issue, including any subsequent correction.

What is claimed is:

1. A computer system comprising:
   one or more processors;
   a memory storing one or more data objects and instructions which, when executed by the one or more processors, cause performance of:
   generating task objects and causing the task objects to be stored in the memory;
   attaching particular data objects stored in the memory to particular generated task objects;
   identifying a first field of a first task object, of the task objects, that corresponds to a second field of a first data object, of the data objects, the first data object having been attached to the first task object, the second field storing a particular value;
   assigning the first field of the first task object to the particular value of the second field of the first data object;
   determining that the particular value in the first field of the task object has changed and, in response, updating the particular value in the second field of the first data object.

2. The system of claim 1, wherein the first field and the second field are both one of: a location attribute, object title, object description, or assigned user or user group.

3. The system of claim 1, wherein the instructions, when executed by the one or more processors, further cause performance of:
   receiving location input that identifies geographic locations to associate with the task objects, and to store information describing the geographic locations in association with the task objects;
   displaying task icons representing the task objects on a map based on the stored information describing the geographic locations.

4. The system of claim 1,
   wherein the task objects conform to a task object data structure type, the task object data structure type defining task object fields of the task objects, including the first field;
   wherein the data objects conform to particular data object structure types that define particular fields of the data objects, the particular data object structure types being different from the task object data structure type;
   wherein the instructions, when executed by the one or more processors, further cause performance of determining that the second field corresponds to the first field by comparing first definition data for the task object data structure type to second definition data for a first data object structure type to which the first data object conforms.

5. The system of claim 1, wherein the instructions, when executed by the one or more processors, further cause performance of:
   receive input indicating that tasks corresponding to particular task objects have been completed;
   responsive to input indicating that a first task corresponding to the first task object has been completed, and based on the first task object being attached to the first data object, automatically change a status field of the first data object.

6. The system of claim 1, wherein the instructions, when executed by the one or more processors, further cause performance of:
   displaying, on a map, a plurality of task icons representing a plurality of the task objects that have not been assigned to user objects, of the data objects, and displaying a plurality of user icons representing a plurality of the user objects;
   receiving assignment inputs that drags particular user icons over particular task icons;
   attaching particular user objects, corresponding to the particular user icons, to particular task objects, corresponding to the particular task icons, responsive to the assignment inputs.

7. The system of claim 1, wherein the instructions, when executed by the one or more processors, further cause performance of:
   displaying indications of distances between first locations associated with a plurality of the task objects and a second location associated with a particular user object, of the data objects;
   responsive to input selecting a second task object from the plurality of the task objects, storing an association between the second task object and the particular user object.

8. The system of claim 1, wherein the instructions, when executed by the one or more processors, further cause performance of:

determining that the first data object has been updated to store information describing a new geographic location;

responsive to the determining that the first data object has been updated, moving a first icon that represents the first task object to a new position on a map, the new position reflecting the new geographic location.

9. A method comprising:

receiving a first request to generate a task object that describes a task;

responsive to the first request, generating the task object, the task object being a data structure that comprises values for task object fields that represent attributes of the task;

identifying, in a repository of data objects, a particular data object to associate with the task object;

determining that a first field of the task object fields corresponds to a second field of the particular data object, the second field of the particular data object representing a location attribute having a particular value;

assigning, to the first field of the task object, the particular value of the corresponding second field;

determining that the particular value in the first field of the task object has changed and, in response, updating the particular value in the second field of the particular data object, wherein the method is performed by one or more computing devices.

10. The method of claim 9, wherein the first field represents a location attribute, wherein the particular value is location information.

11. The method of claim 9, determining that a third field of the task object fields corresponds to a fourth field of the particular data object, wherein the third field and the fourth field are both one of: an object title, object description, or an assigned user or user group;

assigning to the third field of the task object the particular value of the corresponding fourth field.

12. The method of claim 9, further comprising:

receiving a second request to attach the particular data object to the task object;

generating a link between the task object and the particular data object;

wherein assigning the first field of the task object to the particular value of the corresponding second field occurs responsive to the second request.

13. The method of claim 9, wherein the task object conforms to a task object data structure type, the task object data structure type defining the task object fields;

wherein the particular data object conforms to a particular data object structure type that defines particular fields of the particular data object, the particular data object structure type being different from the task object data structure type;

wherein determining that the second field corresponds to the first field comprises comparing first definition data for the task object data structure type to second definition data for the particular data object structure type.

14. The method of claim 9, further comprising:

receiving input indicating that the task corresponding to the task object is complete;

responsive to the input, based on the association between the task object and the particular data object, automatically changing a status field of the particular data object.

15. The method of claim 9, further comprising:

identifying, in a repository of data objects, a second particular data object to associate with the task object;

determining that a third field of the task object fields corresponds to a fourth field of the second particular data object, the fourth field of the second particular data object having a second particular value;

assigning the third field of the task object to the second particular value of the corresponding fourth field.

16. A method comprising:

receiving a request to generate a task object that describes a task;

generating the task object responsive to the request;

storing an association between the task object and a particular data object, the particular data object storing different data than the task object;

determining that a first field in the task object corresponds to a second field of the particular data object, the second field of the particular data object having a particular value;

automatically copying the particular value of the corresponding second field to the first field of the task object;

determining that the particular value in the first field of the task object has changed and, in response, updating the particular value in the second field of the first particular data object;

wherein the method is performed by one or more computing devices.

17. The method of claim 16, further comprising:

receiving first input that identifies a first geographic location to associate with the task object;

storing information describing the first geographic location in association with the task object;

displaying a first icon representing the task object on a geographic map, the first icon placed on the geographic map at a point that corresponds to the stored information describing the first geographic location of the task object;

determining that the task object has been updated to store a second geographic location that is not the first geographic location;

moving the first icon on the geographic map to reflect the second geographic location.

18. The method of claim 16, further comprising:

displaying, on a map, a plurality of task icons representing a plurality of task objects that have not been assigned to user objects, the plurality of task icons including a first icon associated with the task object;

displaying a plurality of user icons representing the user objects;

receiving input that drags a particular user icon over the first icon;

storing an association between the task object and a particular user object represented by the particular user icon, the association indicating that the task object is assigned to the particular user object.

19. The method of claim 16, further comprising:

displaying, on the map, a plurality of task icons representing a plurality of task objects that have not been assigned to user objects, the plurality of task icons including a first icon associated with the task object;

displaying indications of distances between first locations associated with the plurality of the task objects and a second location associated with a particular user object;

responsive to input selecting the first icon, storing an association between the task object and the particular user object, the association indicating that the task object is assigned to the particular user object.

* * * * *